United States Patent
Takenaka et al.

(10) Patent No.: US 12,306,599 B2
(45) Date of Patent: May 20, 2025

(54) INFORMATION PROCESSING DEVICE, DISPLAY CONTROL METHOD, AND COMPUTER-READABLE RECORDING MEDIUM FOR OPERATION ASSISTANCE OF PLANT

(71) Applicant: YOKOGAWA ELECTRIC CORPORATION, Tokyo (JP)

(72) Inventors: Azusa Takenaka, Tokyo (JP); Zhexing Wang, Tokyo (JP); Kineo Mitsuishi, Tokyo (JP); Tomohiro Sakita, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 366 days.

(21) Appl. No.: 17/875,936

(22) Filed: Jul. 28, 2022

(65) Prior Publication Data

US 2023/0034693 A1    Feb. 2, 2023

(30) Foreign Application Priority Data

Jul. 29, 2021    (JP) .................... 2021-124844

(51) Int. Cl.
    G05B 13/04      (2006.01)
(52) U.S. Cl.
    CPC .................. G05B 13/048 (2013.01)
(58) Field of Classification Search
    CPC ............. G05B 13/048; G05B 23/024
    See application file for complete search history.

(56) References Cited

U.S. PATENT DOCUMENTS

| | | | |
|---|---|---|---|
| 2014/0292765 A1* | 10/2014 | Maruyama | G06T 11/206 345/440 |
| 2016/0155315 A1* | 6/2016 | McElhinney | G05B 23/024 340/502 |
| 2018/0373208 A1 | 12/2018 | Wee et al. | |
| 2019/0188584 A1* | 6/2019 | Rao | G06Q 10/00 |
| 2019/0250572 A1* | 8/2019 | Namie | G05B 13/042 |
| 2020/0103886 A1* | 4/2020 | Gandenberger | G05B 23/0283 |
| 2020/0379442 A1* | 12/2020 | Chan | B01J 19/0033 |

FOREIGN PATENT DOCUMENTS

| | | | |
|---|---|---|---|
| JP | 2001-106703 A | 4/2001 | |
| JP | 2016-189166 A | 11/2016 | |
| JP | 2018-156152 A | 10/2018 | |
| WO | 2020/227383 A1 | 11/2020 | |

OTHER PUBLICATIONS

Sohrab Zendehboudi et al. Applications of hybrid models in chemical, petroleum, and energy systems: A systematic review, Applied Energy, Elsevier, vol. 228, Oct. 1, 2018, pp. 2539-2566 (28 pages).
Extended European Search Report issued in corresponding European Application No. 22187520.6 issued Dec. 19, 2022 (11 pages).

* cited by examiner

*Primary Examiner* — Nicholas Klicos
(74) *Attorney, Agent, or Firm* — Osha Bergman Watanabe & Burton LLP

(57) ABSTRACT

An information processing device includes a controller and a display. The controller acquires a first prediction result that indicates information concerning a state of a plant that is predicted by a physical model, and acquires a second prediction result that indicates information concerning a state of the plant that is predicted by a machine learning model that is generated based on data concerning the plant. The display displays the first prediction result and the second prediction result.

6 Claims, 27 Drawing Sheets

FIG.5A $$\frac{dx}{dt} = K(T)f(x)$$

$$x = \frac{m_0 - m_t}{m_0 - m_\infty}$$

$$K(T) = A\exp\left(-\frac{E}{RT}\right)$$

$$f(x) = 2(1-x)[-\ln(1-x)]^{1/2}$$

x: CONVERSION RATE
t: TIME POINT
T: TEMPERATURE
K (T): REACTION RATE CONSTANT
$m_0$: INITIAL MASS
$m_t$: MASS AT TIME POINT t
$m_\infty$: MASS AT TIME OF END OF REACTION
A: FREQUENCY FACTOR
E: ACTIVATION ENERGY
R: GAS CONSTANT

FIG.5B $$\frac{dX}{dt} = \frac{(k_p + k_{fm})w_m P}{w_{m,0}},$$

$$\frac{dw_i}{dt} = -k_d w_i,$$

$$\frac{dw_s}{dt} = -k_{fs} w_s P,$$

$$P = \left(\frac{2f_i k_d I}{k_{td}}\right)^{1/2},$$

X: MONOMER CONVERSION RATE
$k_x$: REACTION RATE CONSTANT OF EACH REACTION
$w_x$: WEIGHT FRACTION OF x (i: INITIATOR, m: MONOMER, s: SOLVENT)
$w_{x,0}$: INITIAL VALUE OF WEIGHT FRACTION OF x
$f_i$: INITIATOR EFFICIENCY
I: INITIATOR CONCENTRATION
P: RADICAL CONCENTRATION

INFORMATION PROCESSING DEVICE, DISPLAY CONTROL METHOD, AND COMPUTER-READABLE RECORDING MEDIUM FOR OPERATION ASSISTANCE OF PLANT

CROSS-REFERENCE TO RELATED APPLICATION

The present application claims priority to and incorporates by reference the entire contents of Japanese Patent Application No. 2021-124844 filed in Japan on Jul. 29, 2021.

BACKGROUND

Field

The present invention relates to an information processing device, a display control method, and a computer-readable recording medium.

Description of Related Art

A resource demand is increased with population growth and economic growth in future, so that attention has been paid to Circular Economy (CE) that is an effort that is aimed at achieving a balance between economic growth and reduction of an amount of resource consumption. Such CE has also been applied to a recycle field. For example, chemical recycle that is horizontal recycle is needed for realization of CE in a plastic field. On the other hand, although nearly ten percent of plastic is recycled domestically in Japan, difficulty in exportation of a waste plastic has increased, so that domestic processing thereof is demanded.

In recent years, in a recycle plant and/or another/other plant(s) that realize(s) CE, a technique such as predicting accuracy of each process, quality of a product, etc., in the plant, by a simulation that uses a physical model, etc., and operation assistance of the plant that uses the physical model has been known.

Japanese Patent Application Publication No. 2001-106703

Japanese Patent Application Publication No. 2016-189166

Japanese Patent Application Publication No. 2018-156152

However, it may be difficult to execute operation assistance of a plant by a physical model as described above. For example, as a chemical plant is provided as an example, a variation of a raw material is greater in a chemical plant for CE, so that it is difficult to prepare a physical model that corresponds to each variation. Furthermore, in a case where a single physical model that matches respective variations is used, accuracy of prediction that is executed by such a physical model is degraded, so that validity and/or safety of operation assistance is/are also decreased.

SUMMARY

One or more embodiments make it possible to construct an operation assistance system of a plant.

According to an aspect of one or more embodiments, an information processing device includes a first prediction unit (a controller) that acquires a first prediction result that indicates information concerning a state of a plant that is predicted by a physical model, a second prediction unit (the controller) that acquires a second prediction result that indicates information concerning a state of the plant that is predicted by a machine learning model that is generated by using data concerning the plant, and a display control unit (a display) that displays the first prediction result and the second prediction result.

According to an aspect of one or more embodiments, an display control method includes acquiring a first prediction result that indicates information concerning a state of a plant that is predicted by a physical model, acquiring a second prediction result that indicates information concerning a state of the plant that is predicted by a machine learning model that is generated by using data concerning the plant, and displaying the first prediction result and the second prediction result.

According to an aspect of one or more embodiments, a computer-readable recording medium stores therein display control instructions that cause a computer to perform a process including acquiring a first prediction result that indicates information concerning a state of a plant that is predicted by a physical model, acquiring a second prediction result that indicates information concerning a state of the plant that is predicted by a machine learning model that is generated by using data concerning the plant, and displaying the first prediction result and the second prediction result.

BRIEF DESCRIPTION OF THE DRAWINGS

FIG. 5A is a diagram that explains an example of a physical model according to one or more embodiments;

FIG. 5B is a diagram that explains another example of a physical model according to one or more embodiments;

DETAILED DESCRIPTION

Figure 1:
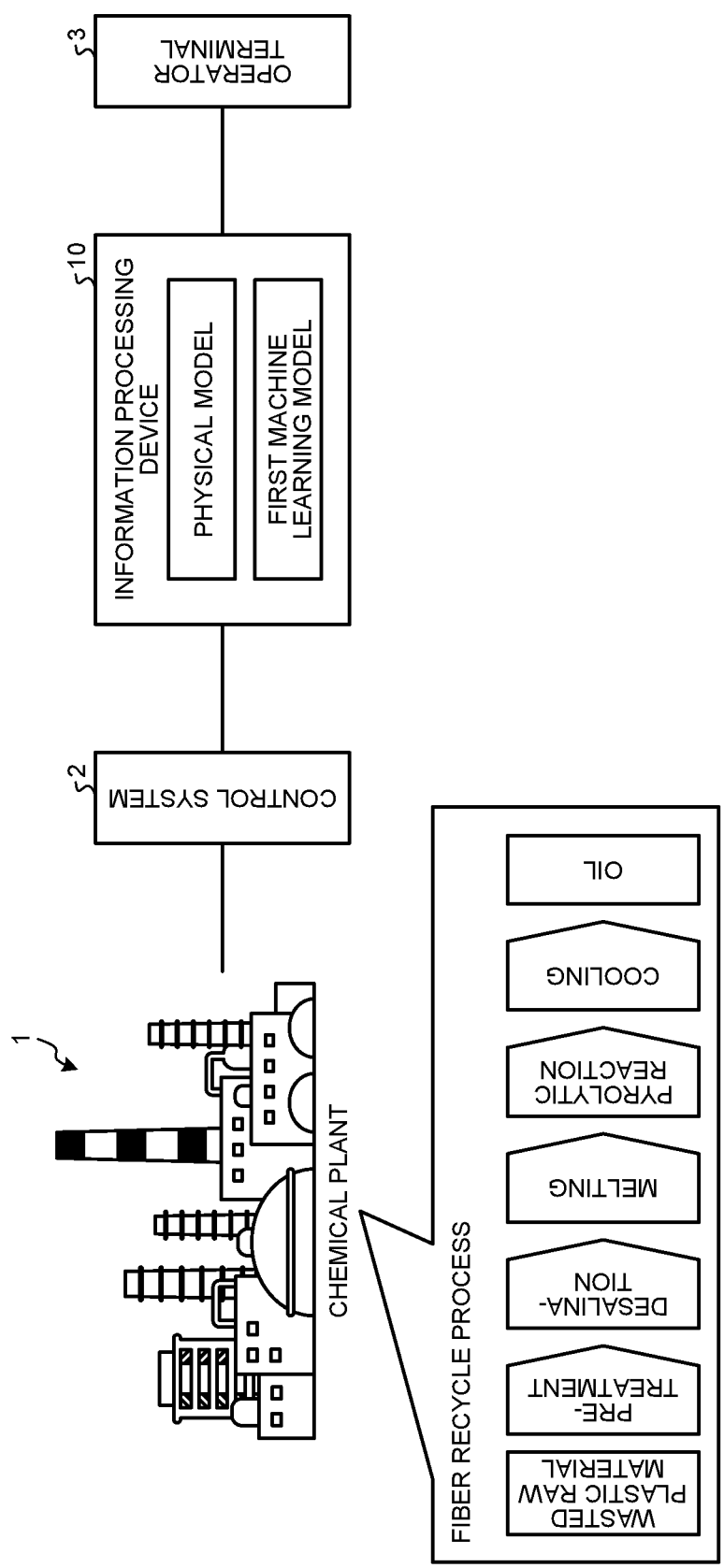
FIG. 1 is a diagram that explains an example of an operation assistance system that includes an information processing device according to one or more embodiments.

Hereinafter, embodiments of an information processing device, a display control method, and a computer-readable recording medium as disclosed in the present application will be explained in detail based on the drawing(s). Additionally, this invention is not limited by such embodiments. Furthermore, an identical element will be provided with an identical sign so as to omit a redundant explanation(s) thereof appropriately, and it is possible to combine respective embodiments appropriately unless inconsistent with one another.

FIRST EXAMPLE

Overall Configuration

FIG. 1 is a diagram that explains an example of an operation assistance system that includes an information processing device 10 according to one or more embodiments. As illustrated in FIG. 1, such an operation assistance system is a system that has a chemical plant 1, a control system 2, an information processing device 10, and an operator terminal 3, and assists a safe operation of the chemical plant 1 by the information processing device 10. Additionally, respective devices are connected by a communication network such as the Internet and/or a dedicated line regardless of a wired and/or wireless one(s).

The chemical plant 1 is an example of a pyrolysis process that executes waste plastic recycle. A pyrolysis process includes a series of processes such as pretreatment, desalination, and melting of a waste plastic raw material (wasted plastic raw material), a pyrolytic reaction of a molten raw material, and cooling of a gas that is produced by such a pyrolytic reaction. Additionally, although a pyrolysis process will be explained as an example in one or more embodiments, it is also possible to apply it to another/other process(es) similarly.

The control system 2 is an example of a Distributed Control System (DCS) that includes a computer device that controls an operation of the chemical plant 1 by an operation of an operator and/or automatic control. Furthermore, the control system 2 has a controller that controls various types of state quantities (for example, a pressure, a temperature, a flow rate, etc.) in a process at a plant, a factory, etc., so that a sophisticated automatic operation is realized. For example, a controller acquires detection results of a plurality of sensors (a flowmeter, a thermometer, etc.), obtains an operation amount of an actuator (a valve, etc.) depending on such detection results, and operates such an actuator depending on such an operation amount, so that various types of state quantities as described above are controlled.

The operator terminal 3 is an example of a computer device that is used by an operator that monitors an operation situation of the chemical plant 1 and/or executes various types of control for the control system 2. The information processing device 10 is an example of a computer device that executes operation assistance that uses a machine learning model that realizes CE for the chemical plant 1.

Figure 2:
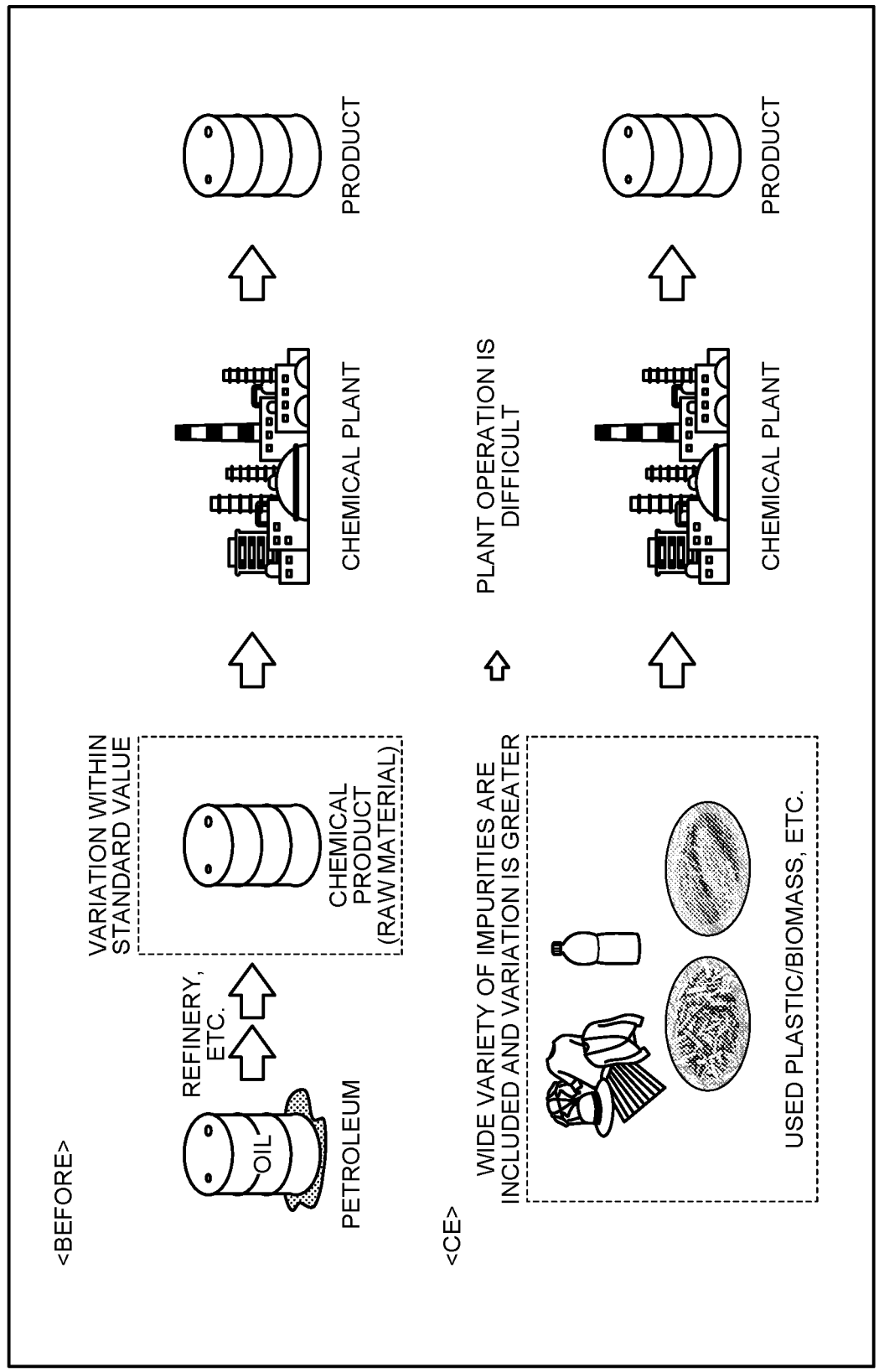
FIG. 2 is a diagram that explains a problem in realization of CE.

A pyrolysis process contributes to CE realization by plastic recycle. Herein, a problem of a recycle process in CE realization will be explained. As illustrated in FIG. 2, a product such as a PET bottle has been produced from a chemical product that is provided by refining petroleum, as a raw material, at a chemical plant, before CE is executed. In such a technique, a raw material is produced from petroleum by a unified refinement technique, so that a variation of such a raw material falls within a standard value and an operation of a chemical plant is also less influenced. That is, it is possible to execute prediction control that uses a unified physical model, etc.

On the other hand, for CE, a product such as a PET bottle is produced from a used plastic, biomass, etc., as a raw material, at a chemical plant. For such CE, a raw material that includes a wide variety of impurities so as to have a greater variation is used, so that selection of an operation and/or determination of a state that is/are suitable for a state of such a raw material is/are needed and an operation of a chemical plant is difficult. That is, it is difficult to execute prediction control that uses a unified physical model, etc.

Hence, in one or more embodiments, prediction that is executed by a physical model that uses a raw material is complemented by a machine learning model, by using a hybrid model that uses such a physical model and such a machine learning model, so that operation assistance that is suitable for a state of such a raw material is executed automatically.

Figure 3:
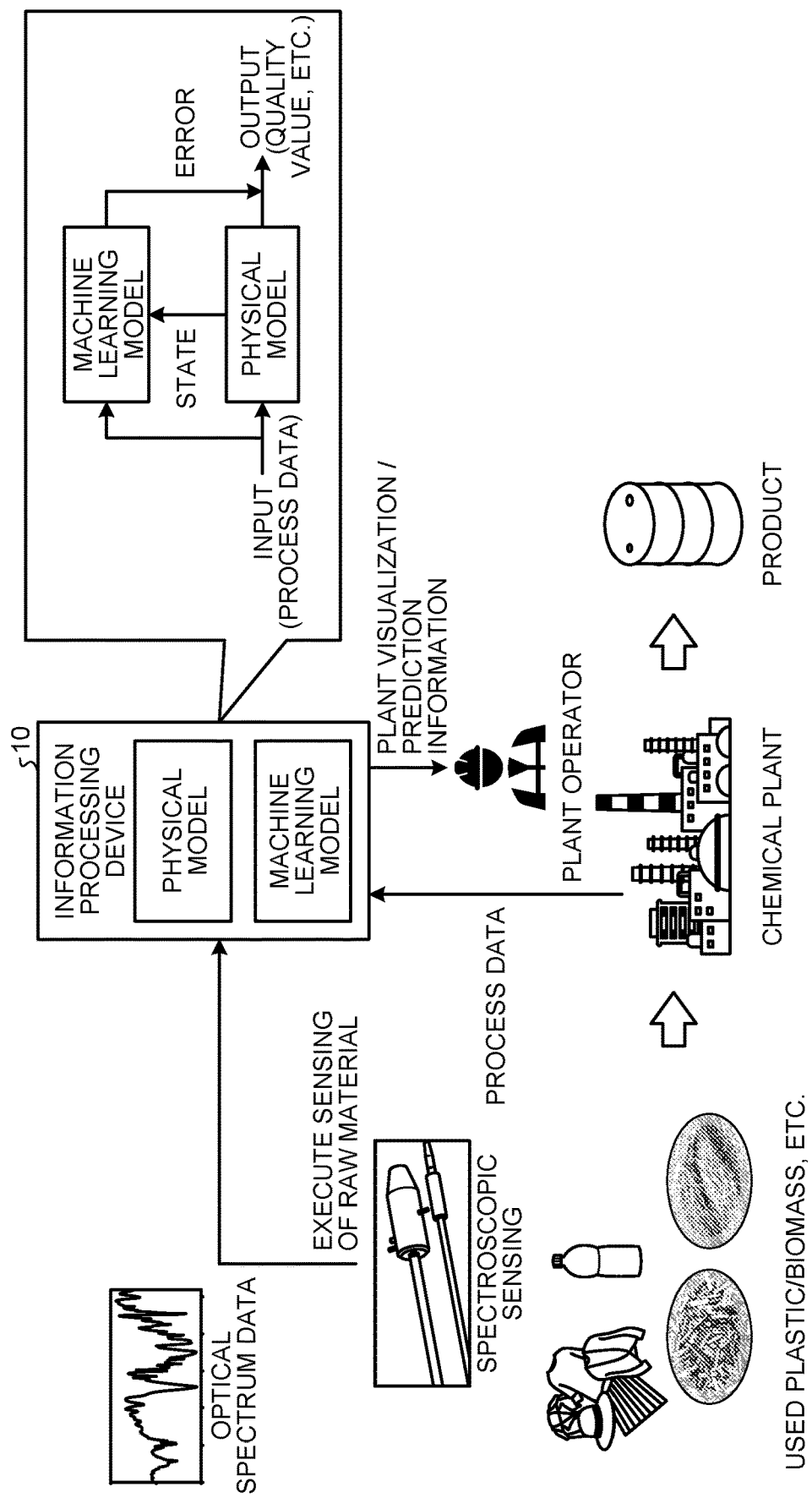
FIG. 3 is a diagram that explains plant operation assistance that uses an information processing device according to one or more embodiments.

Herein, operation assistance that is executed by the information processing device 10 that uses a hybrid model will be explained. FIG. 3 is a diagram that explains plant operation assistance that uses the information processing device 10 according to one or more embodiments. As illustrated in FIG. 3, the information processing device 10 acquires information concerning a state of the chemical plant 1 from optical spectrum data that are obtained by spectroscopic sensing of a raw material, by using a physical model. Furthermore, the information processing device 10 acquires information concerning a state of the chemical plant 1 from optical spectrum data, plant data of the chemical plant 1, and an output result of a physical model, by using a machine learning model.

Then, the information processing device 10 executes providing of information to a plant operator by using an output result of a physical model and an output result of a machine learning model. For example, the information processing device 10 generates and outputs various types of information for a plant operator to determine an operation, such as a concentration of a raw material and/or a temperature of the chemical plant 1, by a total value that is provided by adding an output result of a physical model and an output result of a machine learning model. As a result, it is possible for the information processing device 10 to construct an efficient and safe operation assistance system even in the chemical plant 1 for CE.

Functional Configuration

Next, a functional configuration of each device that realizes an operation assistance system as illustrated in FIG. 1 will be explained. Additionally, a chemical plant 1, a control system 2, and an operator terminal 3 have configurations that are similar to those of respective devices that are utilized for a plant operation, so as to omit a detailed explanation(s) thereof, and an information processing device 10 will be explained herein.

Figure 4:
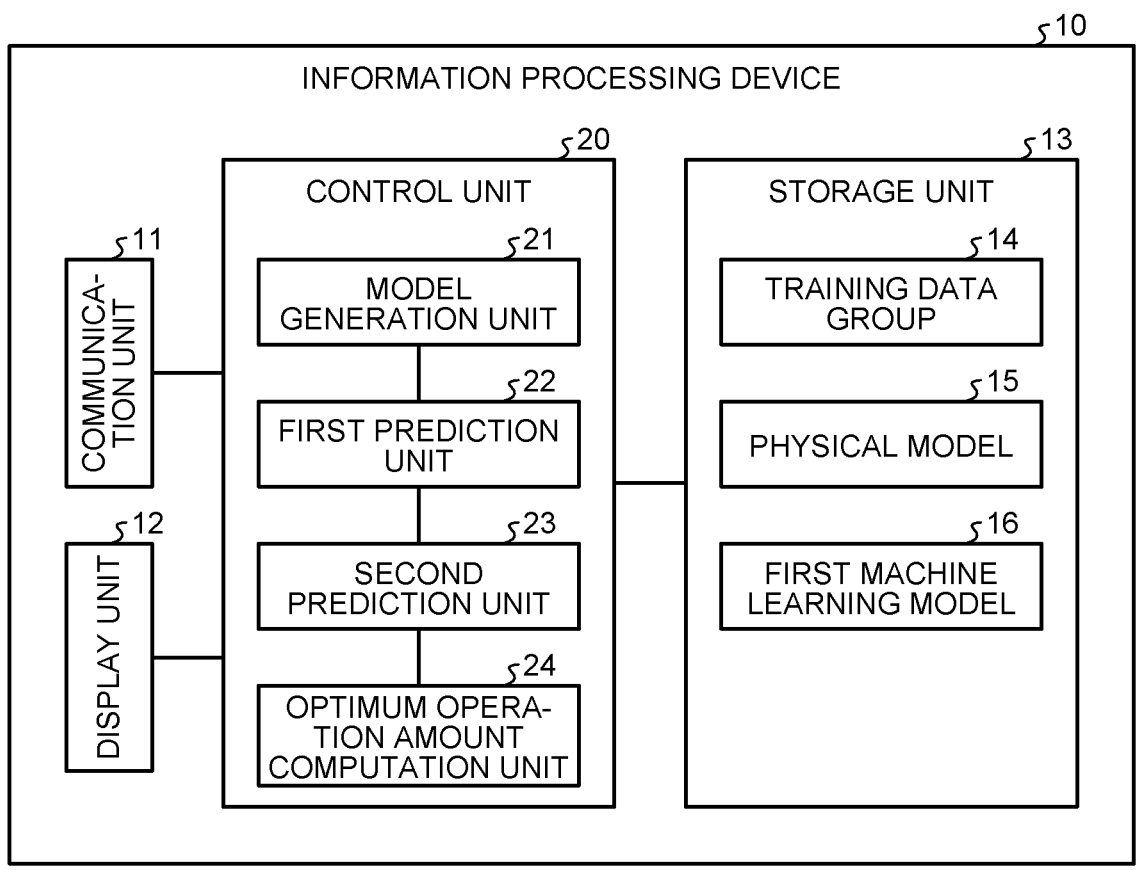
FIG. 4 is a functional block diagram that illustrates a functional configuration of an information processing device according to one or more embodiments.

FIG. 4 is a functional block diagram that illustrates a functional configuration of the information processing device 10 according to one or more embodiments. As illustrated in FIG. 4, the information processing device 10 has a communication unit 11, a display unit 12, a storage unit 13, and a control unit 20.

The communication unit 11 is a processing unit controls communication with another/other device(s) and is realized by, for example, a communication interface, etc. For example, the communication unit 11 receives optical spectrum data from a spectrometer, etc., and acquires plant data from the chemical plant 1. Furthermore, it is also possible for the communication unit 11 to transmit a prediction result that is generated by the control unit 20 to the operator terminal 3 and/or each chemical plant 1.

The display unit 12 is a processing unit that displays and outputs various types of information and is realized by, for example, a display, a touch panel, etc. For example, the display unit 12 displays and outputs a prediction result that is generated by the control unit 20.

The storage unit 13 is a processing unit that stores various types of data, a program (instructions) that is executed by the control unit 20, etc., and is realized by, for example, a memory and/or a hard disk. Such a storage unit 13 stores a training data group 14, a physical model 15, and a first machine learning model 16.

The training data group 14 is composed of a plurality of training data that are used for training of the first machine learning model 16. For example, each of training data that are stored in the training data group 14 is data that include an explanatory variable(s) and an objective variable(s). Herein, an explanatory variable(s) include(s), for example, a difference spectrum data that are provided by eliminating, from optical spectrum data, a principal component thereof, an output result of the physical model 15, etc. An objective variable(s) is/are a difference (an error) between a result (for example, an actual measurement value, a theoretical value, etc.) that is directly obtained from the chemical plant 1 and an output result of the physical model 15, etc.

The physical model 15 is a calculation formula that executes a simulation, etc., that calculate(s) information concerning a state of the chemical plant 1, etc. For example, the physical model 15 is a formula of chemical reaction kinetics such as "dCa/dt=−kCaCb", etc. Herein, Ca and Cb denote components, a and b denote compositions, t denotes time, and k denotes a reaction rate constant. In such a formula, an initial composition is an input to the physical model 15 and a time change of a composition is an output therefrom.

For example, as a physical model of a pyrolytic reaction in a pyrolysis process is provided as an example, it is possible to adopt each formula as illustrated in FIG. 5A as the physical model 15. FIG. 5A is a diagram that explains an example of the physical model 15 according to one or more embodiments. As illustrated in FIG. 5A, the physical model 15 is each formula that is generated based on a chemical reaction formula of a pyrolytic reaction in a pyrolysis process. Herein, x is a conversion rate, t is a time point, T is a temperature, $K(T)$ is a reaction rate constant, $m_0$ is an initial mass, $m_t$ is a mass at time t, $m_\infty$ is a mass at a time of an end of a reaction, A is a frequency factor, E is an activation energy, and R is a gas constant.

Additionally, as a radical polymerization reaction is provided as an example, it is also possible to adopt each formula as illustrated in FIG. 5B as the physical model 15 as well as FIG. 5A. FIG. 5B is a diagram that explains another example of the physical model 15 according to one or more embodiments. As illustrated in FIG. 5B, the physical model 15 is each formula that is generated based on a chemical reaction formula of a radical polymerization reaction. Herein, X is a monomer conversion rate, $k_X$ is a reaction rate constant of each reaction, $w_X$ is a weight fraction of x, $w_i$ is that of an initiator, $w_m$ is that of a monomer, $w_s$ is that of a solvent, $w_{X,0}$ is an initial value of a weight fraction of x, $f_i$ is an initiator efficiency, l is an initiator concentration, and P is a radical concentration.

The first machine learning model 16 is a prediction model that is generated by using algorism such as a neural network. For example, the first machine learning model 16 outputs information (an error) that corrects an output of the physical model 15, depending on an input of a difference spectrum data that is provided by eliminating, from optical spectrum data of a raw material, a principal component thereof, and an output result of the physical model 15.

The control unit 20 is a processing unit that controls a whole of the information processing device 10, and is realized by, for example, a processor, etc. Such a control unit 20 has a model generation unit 21, a first prediction unit 22, a second prediction unit 23, and an optimum operation amount computation unit 24. Additionally, the model generation unit 21, the first prediction unit 22, the second prediction unit 23, and the optimum operation amount computation unit 24 are realized by an electronic circuit(s) that is/are possessed by a processor, a process(es) that is/are executed by such a processor, etc.

Figure 6:
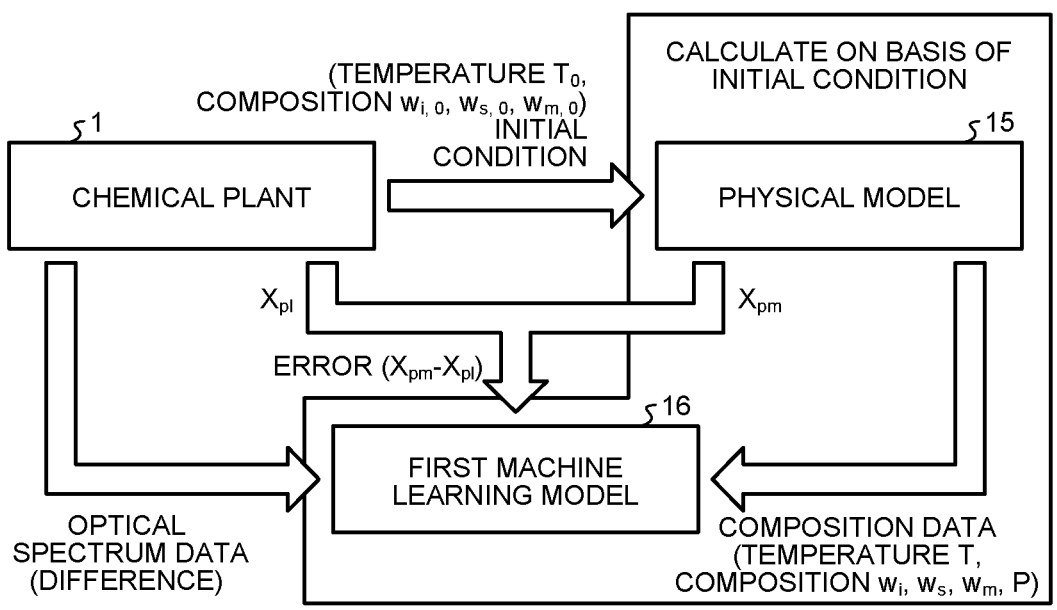
FIG. 6 is a diagram that explains generation of a first machine learning model according to one or more embodiments.

The model generation unit 21 is a processing unit that generates the first machine learning model 16 by using each of training data that are stored in the training data group 14. FIG. 6 is a diagram that explains generation of the first machine learning model 16 according to one or more embodiments. As illustrated in FIG. 6, in the chemical plant 1, a raw material before being put in the chemical plant 1 is sampled and optical spectrum data of such a raw material are measured by using a measurement technique of infrared spectroscopy, Raman spectroscopy, etc., or optical spectrum data of such a raw material are measured by an inline spectroscopic measuring instrument that is installed inside the chemical plant 1. On the other hand, the model generation unit 21 acquires composition data that include a temperature and/or composition information where the physical model 15 outputs such a temperature and/or composition information from an initial condition of the chemical plant 1 and optical spectrum data.

In such a state, the model generation unit 21 inputs difference spectrum data that are generated from optical spectrum data, and composition data of the physical model 15 thereto, and executes training of the first machine learning model 16 so as to output an error between an output $X_{pl}$ of the chemical plant 1 and an output result $X_{pm}$ of the physical model 15.

The first prediction unit 22 is a processing unit that inputs a first component of optical spectrum data that are obtained by spectroscopic sensing of a raw material of a product that is produced in the chemical plant 1 to the physical model 15 so as to acquire a first output result. That is, the first prediction unit 22 executes prediction of composition data, etc., from information of a raw material.

Figure 7:
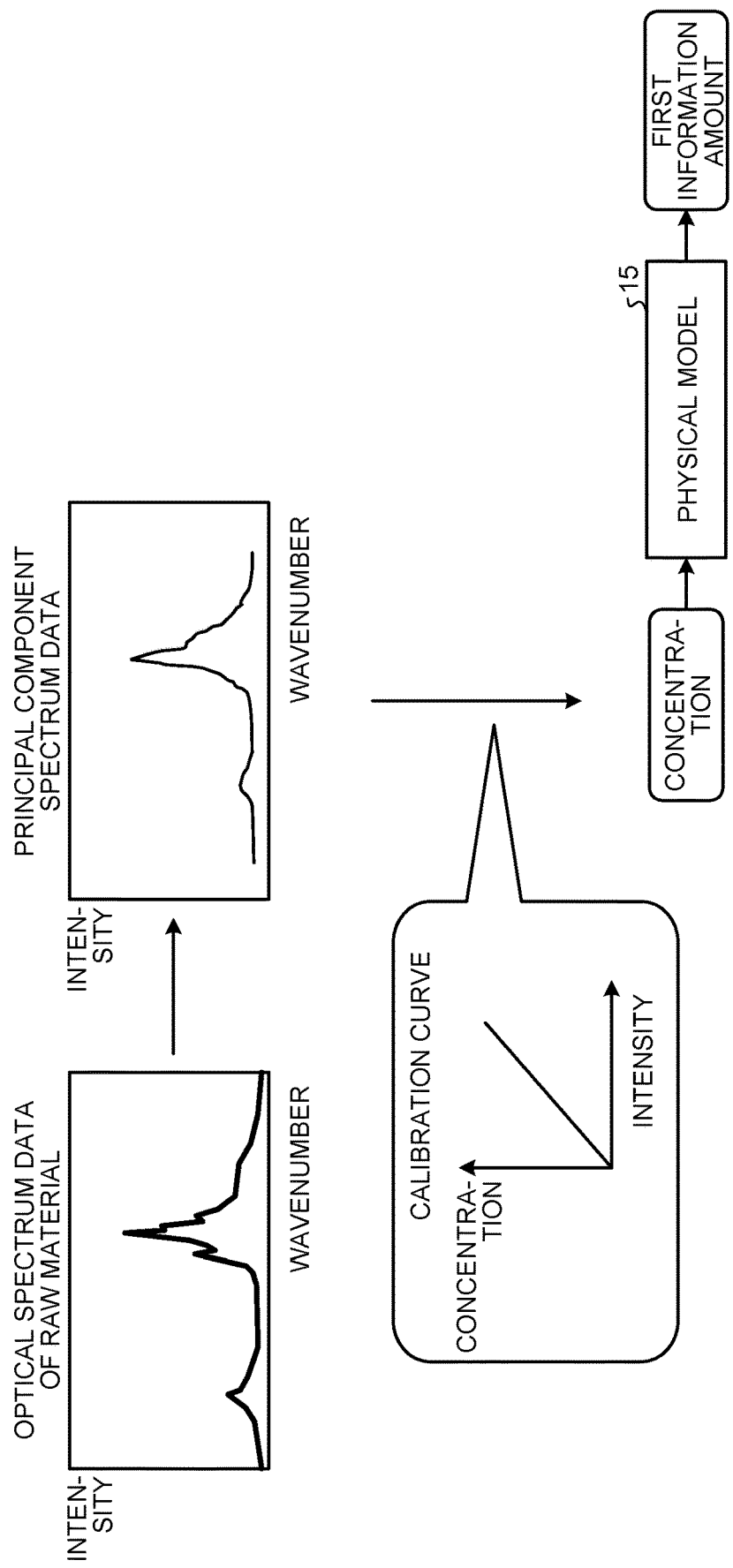
FIG. 7 is a diagram that explains a process of a first prediction unit according to one or more embodiments.

Herein, an example of a process of the first prediction unit 22 will be explained. FIG. 7 is a diagram that explains a process of the first prediction unit 22 according to one or more embodiments. As illustrated in FIG. 7, the first prediction unit 22 extracts, from optical spectrum data of a raw material that are a mixed spectrum, spectrum data of a principal component thereof, by using a spectral subtraction technique in mixed spectrum analysis that is publicly known, etc. Then, the first prediction unit 22 converts spectrum data of a principal component thereto into a concentration by using a calibration curve that indicates a relationship between an intensity and a concentration and is preliminarily prepared. Subsequently, the first prediction unit 22 inputs a concentration to the physical model 15 so as to acquire a first information amount concerning a state of the chemical plant 1 and output it to the second prediction unit 23 and the optimum operation amount computation unit 24. Additionally, spectrum data of a principal component thereof are an example of a first component.

The second prediction unit 23 is a processing unit that inputs a second component of optical spectrum data and an output result of the physical model 15 to the first machine learning model 16 so as to acquire a second output result. That is, the second prediction unit 23 executes prediction of information (an error) that complements an output of the physical model 15 from information of a raw material and composition data of the physical model 15.

Figure 8:
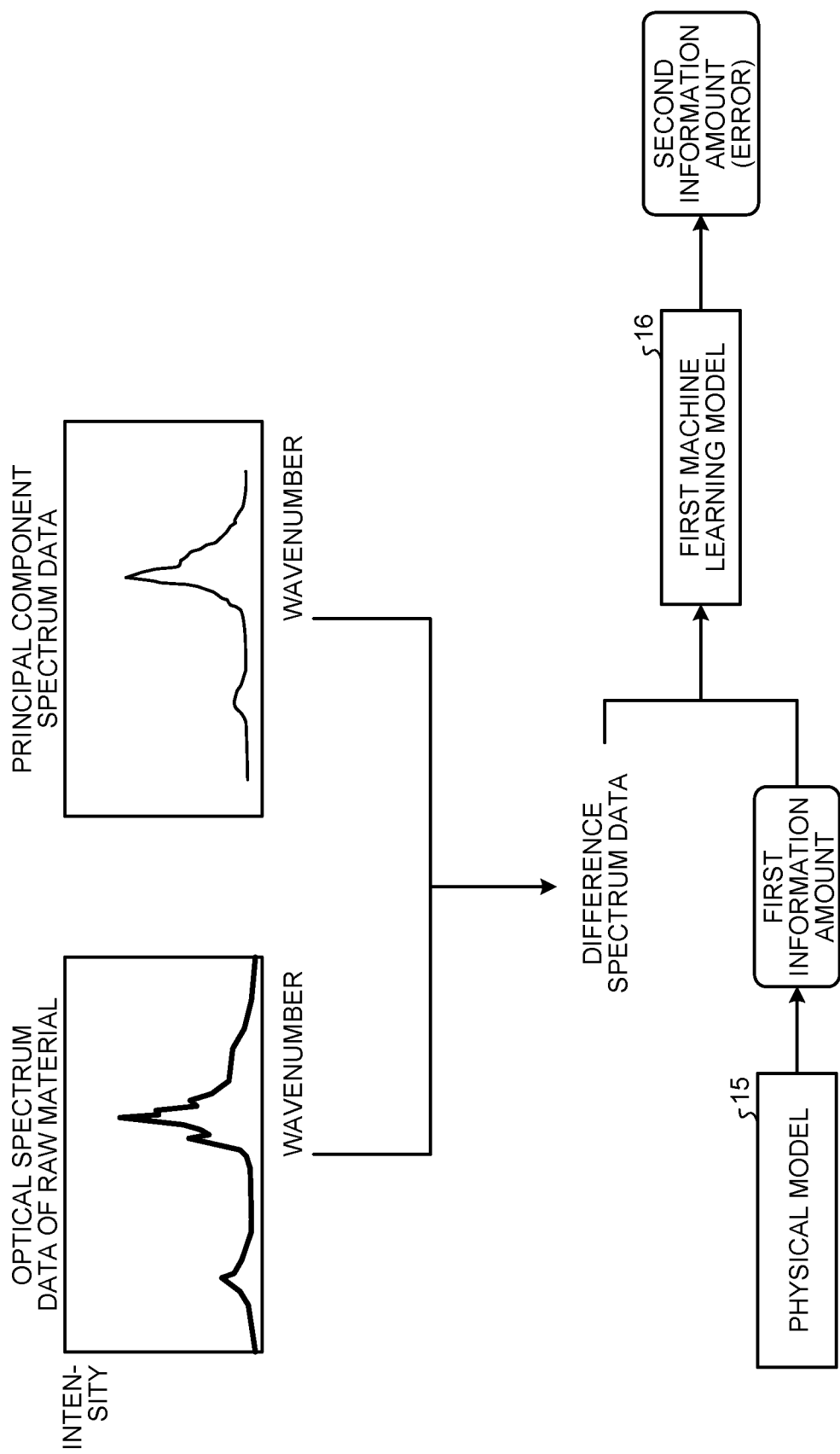
FIG. 8 is a diagram that explains a process of a second prediction unit according to one or more embodiments.

Herein, an example of a process of the second prediction unit 23 will be explained. FIG. 8 is a diagram that explains a process of the second prediction unit 23 according to one or more embodiments. As illustrated in FIG. 8, the second prediction unit 23 generates difference spectrum data that are a difference between optical spectrum data of a raw material and spectrum data of a principal component thereof. Then, the second prediction unit 23 inputs such difference spectrum data and a first information amount that is obtained by the first prediction unit 22 to the first machine learning model 16 so as to acquire a second information amount that corresponds to an error as described above and output it to the optimum operation amount computation unit 24. Additionally, difference spectrum data are an example of a second component.

The optimum operation amount computation unit 24 is a processing unit that outputs information concerning a state of the chemical plant 1 by using a first information amount that is obtained by the first prediction unit 22 and a second information amount that is obtained by the second prediction unit 23. That is, the optimum operation amount computation unit 24 executes operation assistance based on information that is obtained by using a hybrid model.

Figure 9:
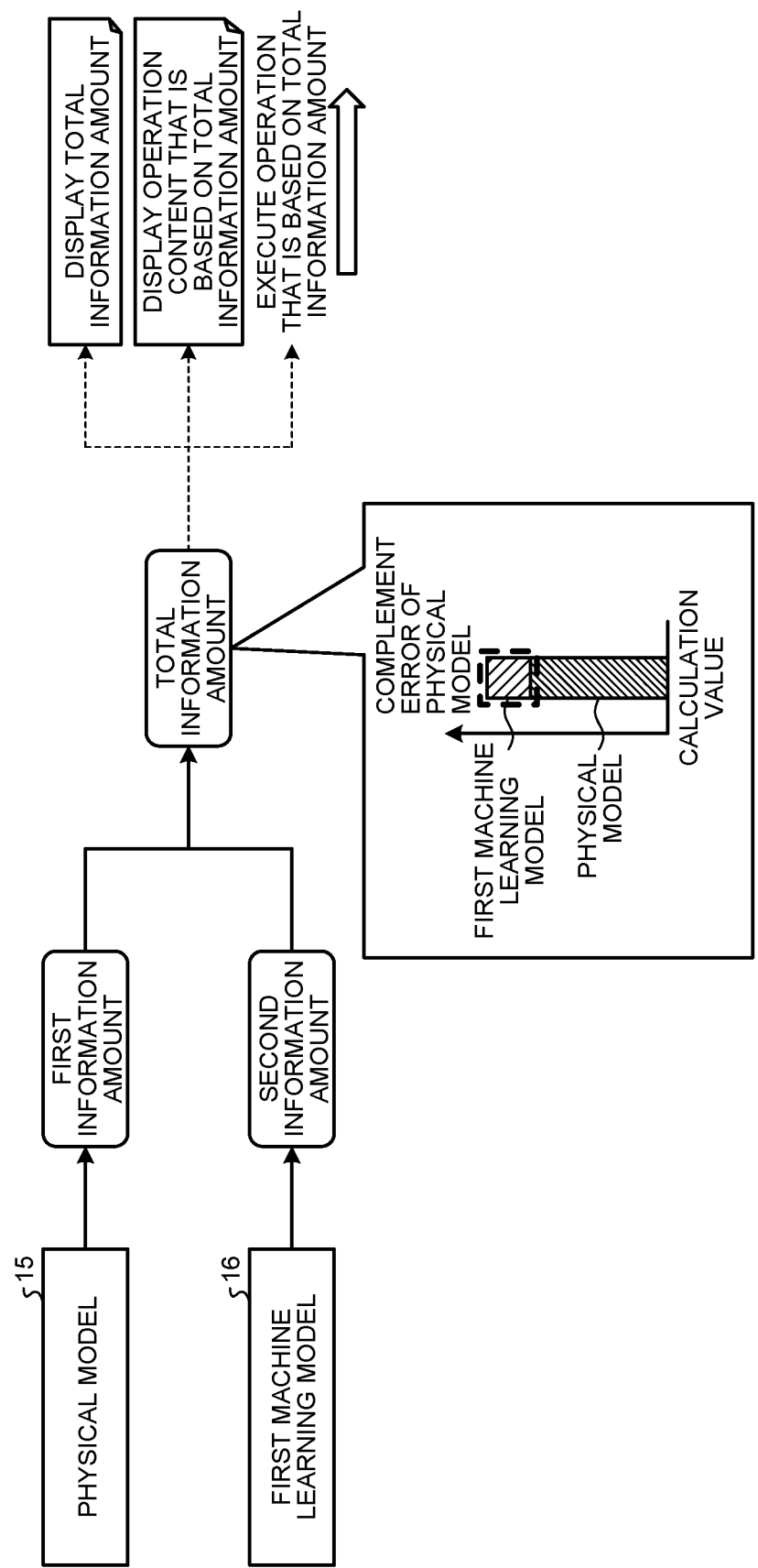
FIG. 9 is a diagram that explains a process of an optimum operation amount computation unit according to one or more embodiments.

FIG. 9 is a diagram that explains a process of the optimum operation amount computation unit 24 according to one or more embodiments. As illustrated in FIG. 9, the optimum operation amount computation unit 24 generates a total information amount that is provided by adding a first information amount that is obtained from the physical model 15 and a second information amount that is obtained from the first machine learning model 16. Such a total information amount is a result that is provided by complementing a first information amount that is logically calculated by the physical model 15 with a second information amount that is obtained from information that is focused on a raw material.

Then, the optimum operation amount computation unit 24 displays a total information amount on the display unit 12 and/or outputs it to the operator terminal 3. In another example, the optimum operation amount computation unit 24 preliminarily defines an information amount and an operation content (for example, raising a temperature setting by 1° C., etc.) and displays an operation content that is specified by such a definition on the display unit 12 and/or outputs it to the operator terminal 3. Furthermore, it is also possible for the optimum operation amount computation unit 24 to execute such an operation content for the chemical plant 1.

Flow of Process

Figure 10:
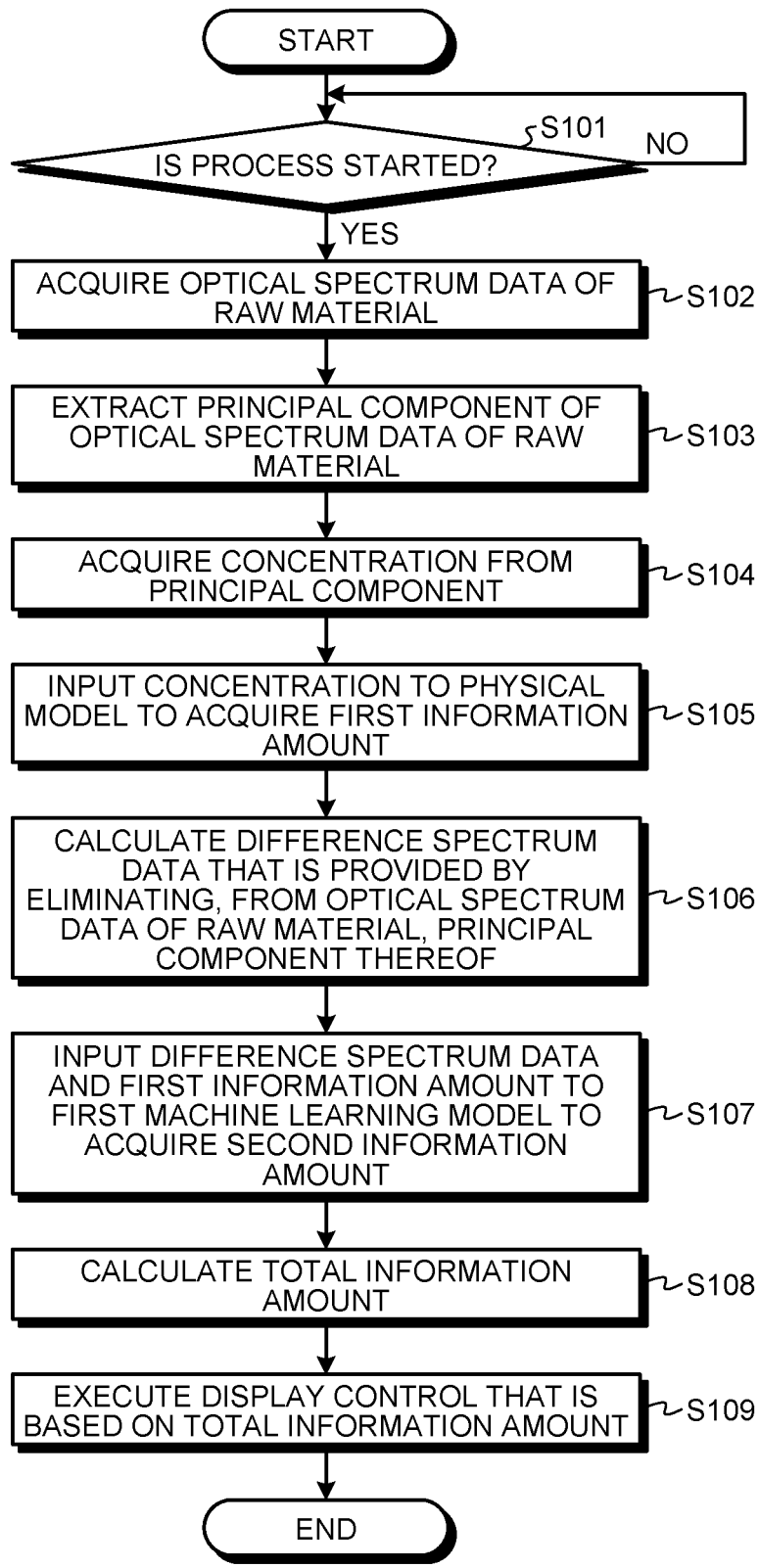
FIG. 10 is a flowchart that illustrates a flow of a process according to one or more embodiments.

FIG. 10 is a flowchart that illustrates a flow of a process according to one or more embodiments. Additionally, the first machine learning model 16 has been generated herein.

As illustrated in FIG. 10, as a process is started (S101: Yes), the first prediction unit 22 acquires optical spectrum data of a raw material (S102), extracts a principal component of such optical spectrum data of a raw material (S103), and acquires a concentration from such a principal component (S104). Subsequently, the first prediction unit 22 inputs a concentration to the physical model 15 so as to acquire a first information amount (S105).

Then, the second prediction unit 23 calculates difference spectrum data that is provided by eliminating, from optical spectrum data of a raw material, a principal component thereof (S106) and inputs such difference spectrum data and a first information amount to the first machine learning model 16 so as to acquire a second information amount (S107).

Subsequently, the optimum operation amount computation unit 24 calculates a total information amount that is provided by adding a first information amount and a second information amount (S108) and executes display control that is based on such a total information amount (S109).

Effect

As described above, it is possible for the information processing device 10 to construct an operation assistance system of the chemical plant 1 by utilizing a hybrid model. For example, for the physical model 15, although an interpretation performance of such a model is higher so as to be effective in understanding a process, a lot of man-hours are needed in order to clarify a mechanism, for improvement of accuracy, and versatility thereof is lower. On the other hand, for the first machine learning model 16, interpretation of a result is difficult, so that it is difficult to express a causal relationship of such a result.

Such an information processing device 10 concurrently uses both the physical model 15 that is capable of being constructed from process knowledge and the first machine learning model 16 where improvement of accuracy thereof is capable of being attained by selection of an explanatory variable(s), so that it is possible to construct an operation assistance system that has higher versatility, is also capable of explaining a causal relationship, and also has higher accuracy.

SECOND EXAMPLE

Additionally, although an example where a single machine learning model (the first machine learning model 16) is used has been explained in the first example, this is not limiting and it is possible to complement an output result of the physical model 15 by using a machine learning model that is focused on a cause of an error. Hence, an example where an output result of a physical model 15 is complemented by further using a second machine learning model 17 that is generated by using, as training data, cause data that are a cause that provides an error to prediction of the physical model 15 will be explained in one or more embodiments. Additionally, the second machine learning model 17 is an example of a cause data machine learning model.

Functional Configuration

Figure 11:
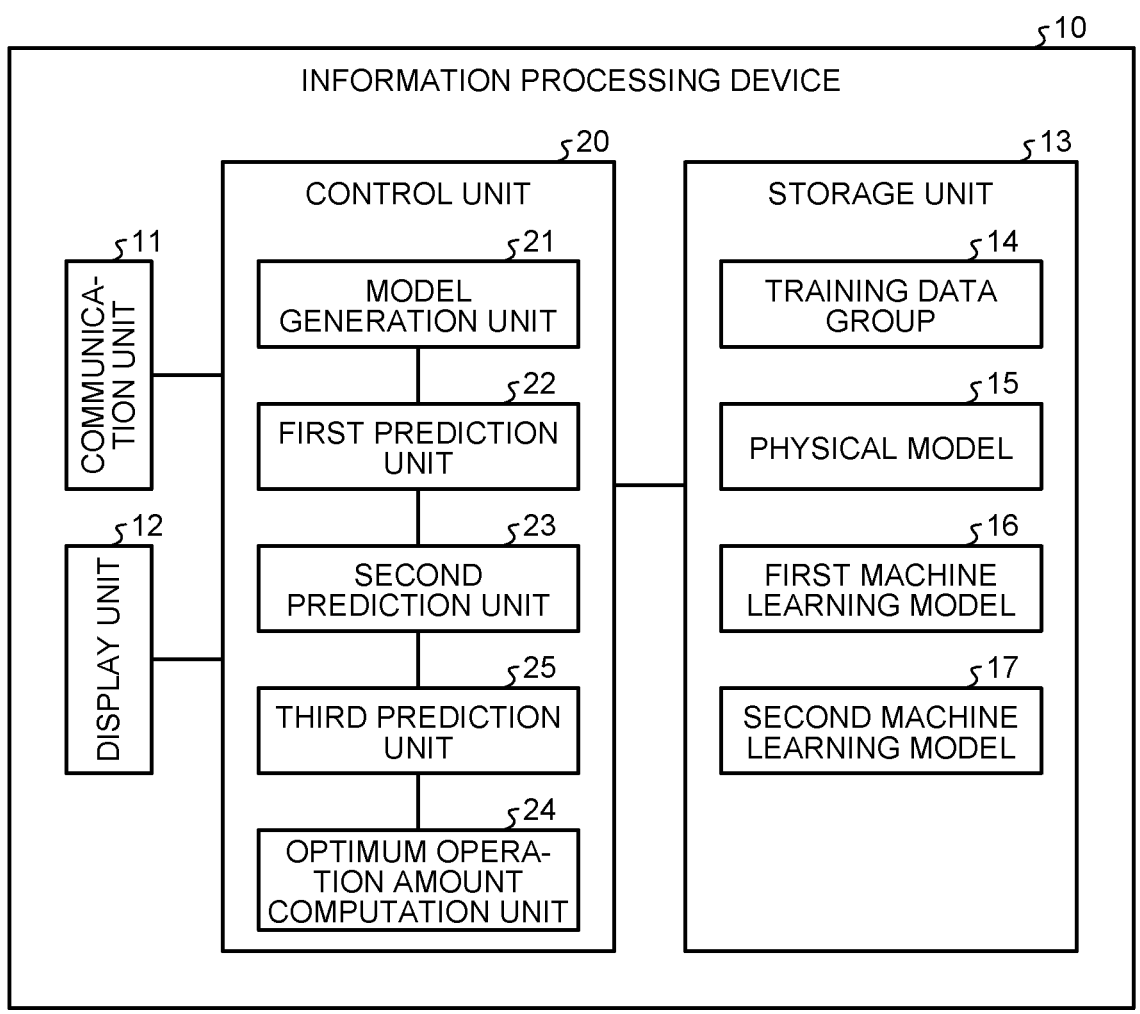
FIG. 11 is a functional block diagram that illustrates a functional configuration of an information processing device according to one or more embodiments.

FIG. 11 is a functional block diagram that illustrates a functional configuration of an information processing device 10 according to one or more embodiments. As illustrated in FIG. 11, the information processing device 10 has a communication unit 11, a display unit 12, a storage unit 13, and a control unit 20, similarly to the first example. Herein, a second machine learning model 17 and a third prediction unit 25 that are different from FIG. 4 as explained in the first example will be explained.

The second machine learning model 17 is a prediction model that is generated by using training data where cause data that are a cause that provides an error to prediction of a physical model 15 and an output result of a first machine learning model 16 are provided as explanatory variables and an error between an output result of the physical model 15 and an output result of the first machine learning model 16 is provided as an objective variable.

Herein, it is possible to adopt, as cause data, data that indicate contamination of a raw material(s) for waste plastic recycle and/or a pyrolysis process, data that indicate a production area of a raw material, data that indicate an external environment of a plant such as an average temperature and/or rainfall and/or an arid area, data that indicate a state of a plant that is a steady operation that is being executed, an operation load, etc., or the like. Such cause data may be a numerical value(s) or may be time-series data, etc., where it is possible to adopt any format and it is also possible to determine any type that is adopted.

For example, it is possible to adopt, as data that indicate contamination of a raw material, data that indicate a mixing degree(s) of a foreign substance(s) into a waste plastic that is a raw material. As a specific example is provided, it is possible to measure a mixed quantity/quantities of a foreign substance(s), determine a mixing degree(s) thereof at three stages, and adopt a result of such determination. Additionally, for measurement of a mixed quantity/quantities of a foreign substance(s), it is possible to measure an amount(s) of a foreign substance(s) that is/are preliminarily specified, by image analysis and/or spectrum analysis, and it is also possible to adopt a prediction result that is obtained by inputting image data and/or spectrum data of a raw material to a machine learning model that has been trained.

The third prediction unit 25 is a processing unit that acquires an error (a third output result) that complements prediction of the physical model 15 by using the second machine learning model 17 that has been trained. That is, the third prediction unit 25 executes prediction of an error (a third output result) that complements prediction of the physical model 15 that has not been able to be completely complemented by the first machine learning model 16 from a cause of an error of the physical model 15 and a difference between composition data of the physical model 15 and composition data of the first machine learning model 16.

Specific Example of Training

Figure 12:
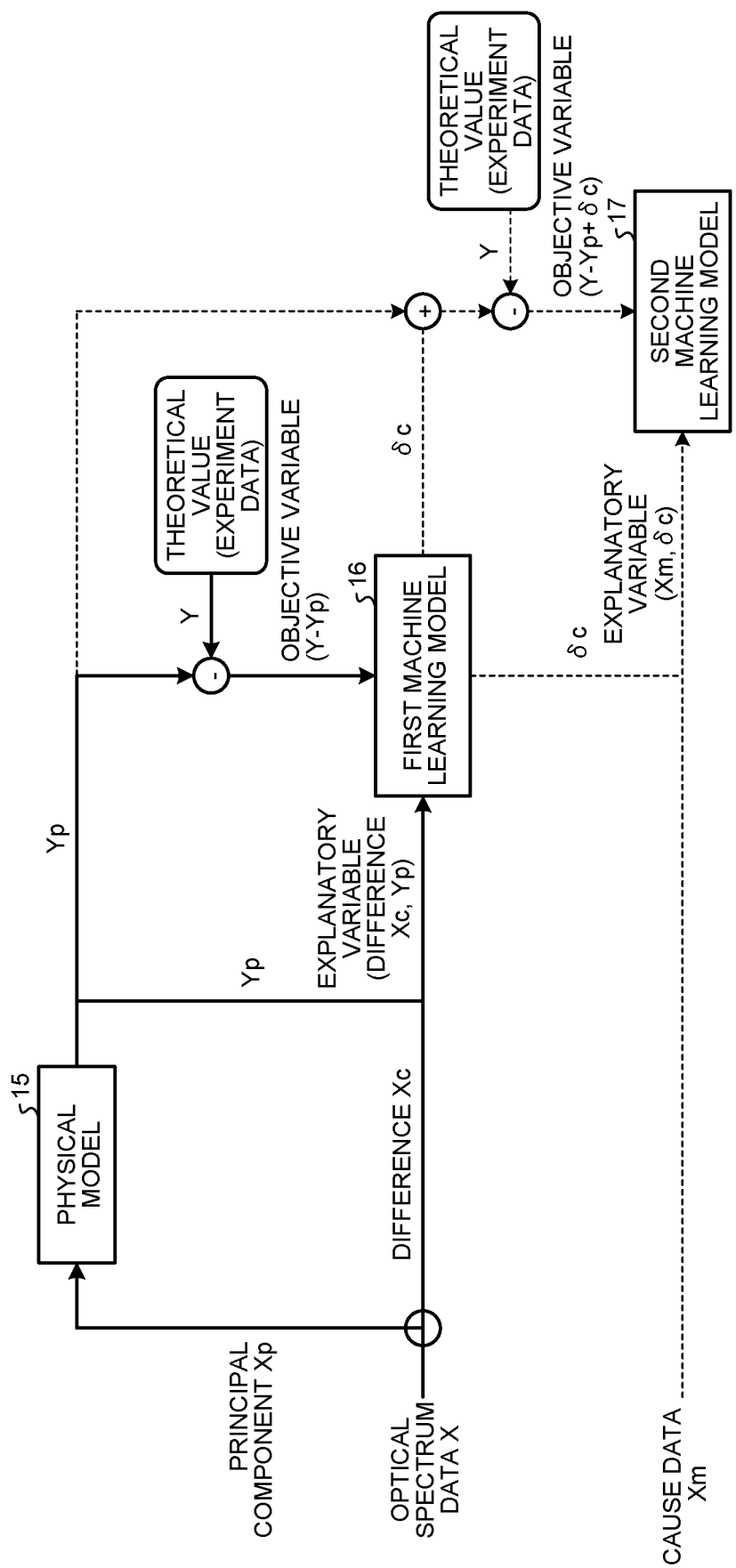
FIG. 12 is a diagram that explains training of each model according to one or more embodiments.

Next, training of each machine learning model that is used in one or more embodiments will be explained that is executed by a model generation unit 21. FIG. 12 is a diagram that explains training of each model according to one or more embodiments. As illustrated in FIG. 12, the model generation unit 21 generates, from optical spectrum data X of a raw material, spectrum data Xp of a principal component thereof and difference spectrum data Xc. Subsequently, the model generation unit 21 inputs spectrum data Xp of a principal component to the physical model 15 so as to acquire a first output result Yp.

Then, the model generation unit 21 executes training of the first machine learning model 16 by using training data that include "difference spectrum data Xc and a first output result Yp" that are explanatory variables and "an error (Y−Yp) between a theoretical value Y and a first output result Yp" that is an objective variable. That is, the model generation unit 21 executes training of the first machine learning model 16 so as to predict an error (Y−Yp) from difference spectrum data Xc and a first output result Yp. Additionally, for a theoretical value Y, it is possible to adopt experiment data, data that are actually measured at a chemical plant 1, data that are identified from a past history, etc., or the like.

Subsequently, the model generation unit 21 executes training of the second machine learning model 17 by using training data that include "cause data Xm and a second output result δc that is an output of the first machine learning model 16" that are explanatory variables and "an error (Y−Yp+δc) between a theoretical value Y and an added value of a first output result Yp and a second output result" that is an objective variable. That is, the model generation unit 21 executes training of the second machine learning model 17 so as to predict an error (Y−Yp+δc) from cause data Xm and a second output result δc.

Specific Example of Operation Assistance

Figure 13:
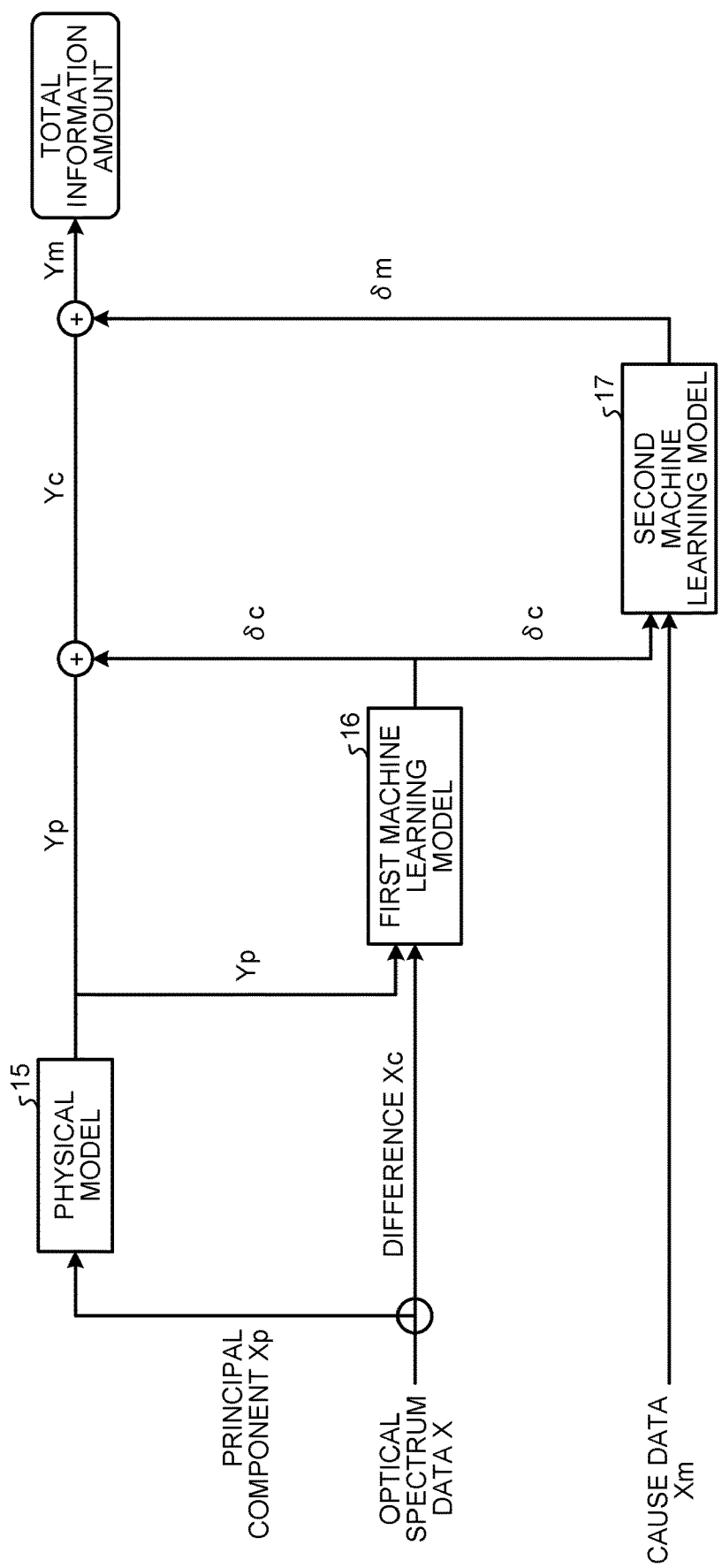
FIG. 13 is a diagram that explains operation assistance according to one or more embodiments.

Next, a specific example where operation assistance is executed by using each machine learning model that is generated by using FIG. 12 will be explained. FIG. 13 is a diagram that explains operation assistance according to one or more embodiments. As illustrated in FIG. 13, a first prediction unit 22 extracts, from optical spectrum data X of a raw material, spectrum data Xp of a principal component thereof and inputs it to the physical model 15 so as to acquire a first output result Yp.

Subsequently, a second prediction unit 23 inputs difference spectrum data Xc and a first output result Yp that is obtained from the physical model 15 to the first machine learning model 16 so as to acquire a second output result δc. Moreover, the third prediction unit 25 inputs cause data Xm and a second output result δc that is obtained from the first machine learning model 16 to the second machine learning model 17 so as to acquire a third output result δm.

Subsequently, an optimum operation amount computation unit 24 generates a total information amount Ym that is provided by adding a first output result Yp that is obtained from the physical model 15, a second output result δc that is obtained from the first machine learning model 16, and a third output result δm that is obtained from the second machine learning model 17. Then, the optimum operation amount computation unit 24 executes operation assistance base on a total information amount Ym.

Effect

As described above, it is possible for the information processing device 10 to complement not only an output of the physical model 15 but also an output of the first machine learning model 16 by using the second machine learning model 17 that has been trained by information of cause data that are a cause that provides an error to prediction of the physical model 15. As a result, it is possible for the information processing device 10 to realize operation assistance with higher accuracy, as compared with the first example.

THIRD EXAMPLE

Additionally, although an example where a single machine learning model (the first machine learning model 16) is used has been explained in the first example, this is not limiting. For example, a plurality of machine learning model are prepared and are dynamically selected for each of types of cause data and/or plants as described above, so that it is possible to attain improvement of accuracy of operation assistance. Hence, an example where operation assistance is executed by dynamically determining a type of cause data and selecting a suitable machine learning model, at a chemical plant 1 during an operation thereof, will be explained as an example in one or more embodiments.

Functional Configuration

Figure 14:
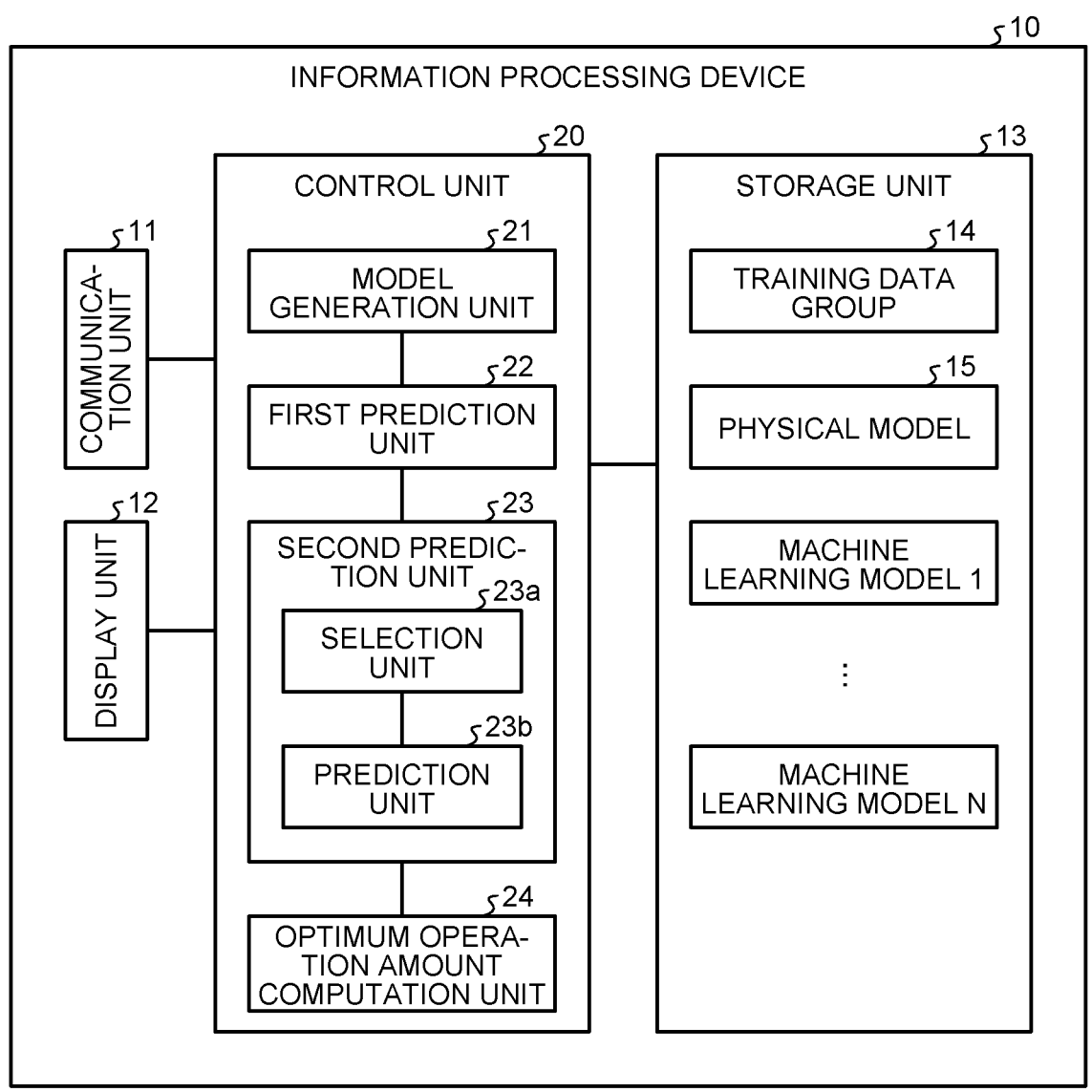
FIG. 14 is a functional block diagram that illustrates a functional configuration of an information processing device according to one or more embodiments.

FIG. 14 is a functional block diagram that illustrates a functional configuration of an information processing device 10 according to one or more embodiments. As illustrated in FIG. 14, the information processing device 10 has a communication unit 11, a display unit 12, a storage unit 13, and a control unit 20, similarly to the first example. Herein, a plurality of machine learning models (machine learning models 1 to N) and a selection unit 23a and a prediction unit 23b in a second prediction unit 23 that are different from FIG. 4 that has been explained in the first example will be explained.

Each of the machine learning models 1 to N is a prediction model that is generated by using different cause data. For example, a machine learning model 1 is generated by using data that indicate contamination of a raw material, a machine learning model 2 is generated by using data that indicate a production area of a raw material, and a machine learning model 3 is generated by using data that indicate an external environment of a plant. Additionally, for training of each of the machine learning models 1 to N, it is possible to adopt a technique(s) that is/are similar to the first example and/or the second example.

The selection unit 23a of the second prediction unit 23 is a processing unit that selects one or more machine learning models that correspond to cause data at a time of prediction, among the machine learning models 1 to N that have been trained. For example, the selection unit 23a selects a corresponding machine learning model according to a value(s) of cause data, a result of analysis of the cause data, a type of a sensor that acquires the cause data, an instruction of a user, or the like.

The prediction unit 23b of the second prediction unit 23 executes prediction of an error that complements an output of a physical model 15 from information of a raw material and composition data of the physical model 15, by using a machine learning model that is selected by the selection unit 23a. For example, the prediction unit 23b inputs cause data, difference spectrum data, and a first output result of the physical model 15 to a selected machine learning model 1 so as to acquire a second output result.

Specific Example of Operation Assistance

Figure 15:
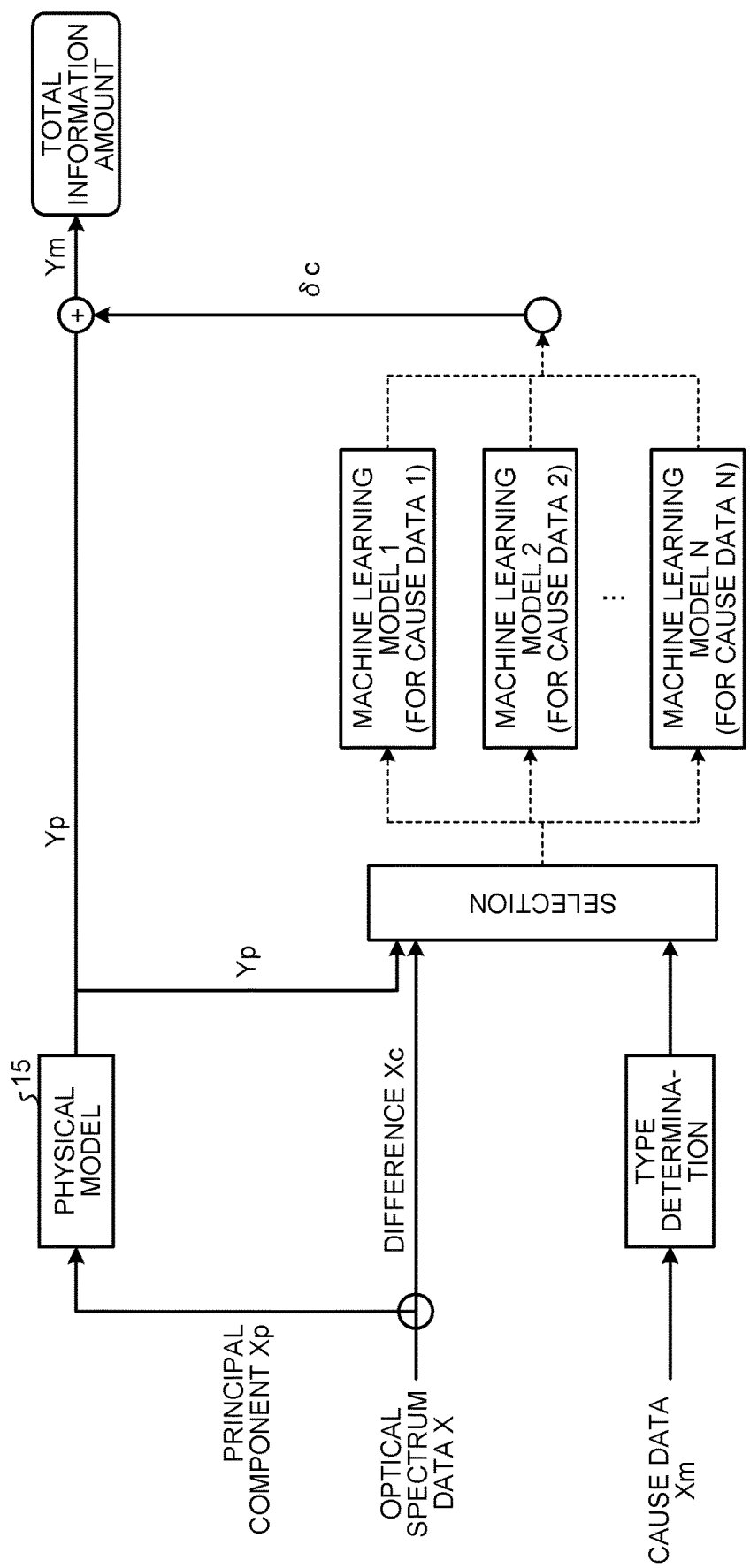
FIG. 15 is a diagram that explains operation assistance according to one or more embodiments.

Next, a specific example where operation assistance in one or more embodiments that is generated by using FIG. 14 is executed will be explained. FIG. 15 is a diagram that explains operation assistance in one or more embodiments. As illustrated in FIG. 15, the first prediction unit 22 extracts, from optical spectrum data X of a raw material, spectrum data Xp of a principal component thereof, and inputs them to the physical model 15 so as to acquire a first output result Yp.

Subsequently, the second prediction unit 23 determines a type of cause data Xm, and selects a corresponding machine learning model. Then, the second prediction unit 23 inputs cause data Xm, difference spectrum data Xc, and a first output result Yp that is obtained from the physical model 15 to a selected machine learning model so as to acquire a second output result δc.

Subsequently, the optimum operation amount computation unit 24 generates a total information amount Ym that is provided by adding a first output result Yp that is obtained from the physical model 15 and a second output result δc that is obtained from one of machine learning models. Then, the optimum operation amount computation unit 24 executes operation assistance based on a total information amount Ym.

Flow of Process

Figure 16:
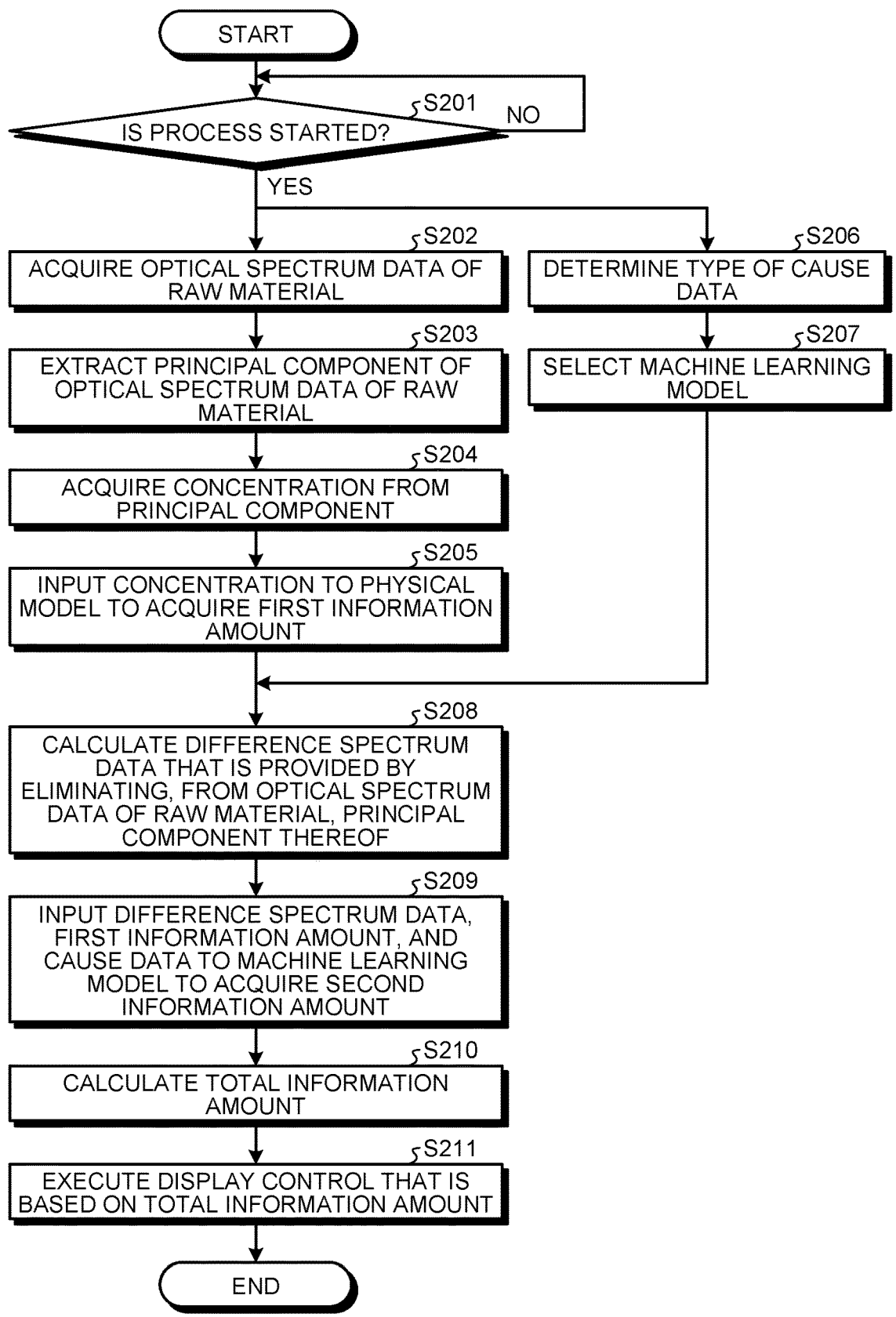
FIG. 16 is a flowchart that illustrates a flow of a process according to one or more embodiments.

FIG. 16 is a flowchart that illustrates a flow of a process according to one or more embodiments. Additionally, machine learning models 1 to N have been generated herein.

As illustrated in FIG. 16, as a process is started (S201: Yes), the first prediction unit 22 acquires optical spectrum data of a raw material (S202), extracts a principal component of such optical spectrum data of a raw material (S203), and acquires a concentration from such a principal component (S204). Subsequently, the first prediction unit 22 inputs a concentration to the physical model 15 so as to acquire a first information amount (S205).

In parallel therewith, the second prediction unit 23 acquires cause data from a chemical plant 1 during an operation thereof so as to determine a type thereof (S206) and selects one or more machine learning models that correspond to such cause data, among a plurality of machine learning models (S207).

Then, the second prediction unit 23 calculates difference spectrum data (S208) and inputs cause data, difference spectrum data, and a first information amount to a selected machine learning model so as to acquire a second information amount (S209).

Subsequently, the optimum operation amount computation unit 24 calculates a total information amount that is provided by adding a first information amount and a second information amount (S210) and executes display control that is based on such a total information amount (S211).

Effect

As described above, it is possible for the information processing device 10 to select a machine learning model that corresponds to cause data that are actually measured at a time of prediction and further utilize a hybrid model, so that it is possible to construct an optimum operation assistance system that is suitable for an operation environment of the chemical plant 1.

FOURTH EXAMPLE

Figure 17:
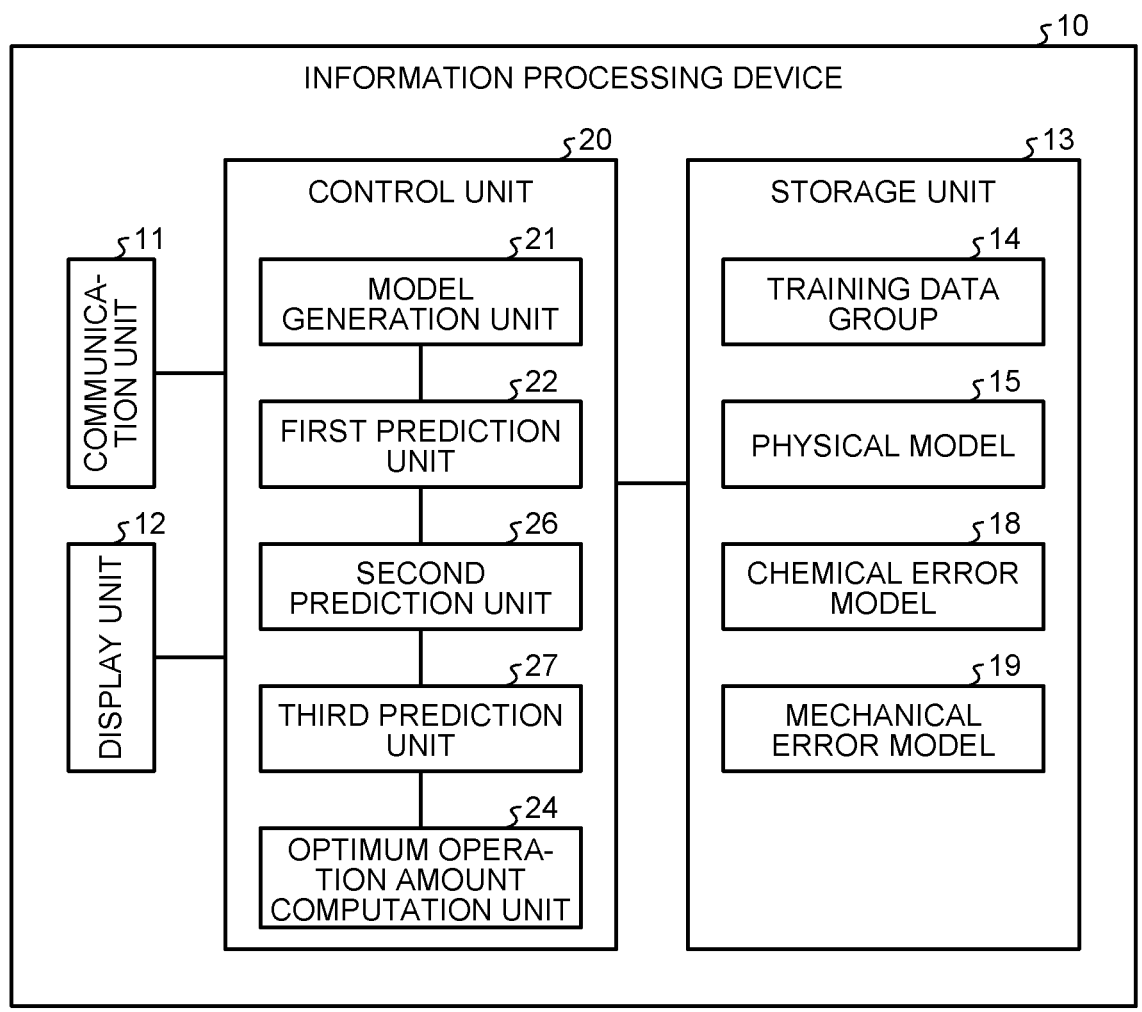
FIG. 17 is a functional block diagram that illustrates a functional configuration of an information processing device according to one or more embodiments.

Additionally, it is possible to attain further improvement of accuracy of a machine learning model that is used for a hybrid model, by concurrently using both a model that is generated by using experiment data and a model that is set for each plant. FIG. 17 is a functional block diagram that illustrates a functional configuration of an information processing device 10 according to one or more embodiments. As illustrated in FIG. 17, the information processing device 10 has a communication unit 11, a display unit 12, a storage unit 13, and a control unit 20.

Herein, a chemical error model 18, a mechanical error model 19, a second prediction unit 26, and a third prediction unit 27 that are of functions that are different from embodiments as described above will be explained.

The chemical error model 18 is a prediction model that is generated by using experiment data concerning an operation of a plant, etc., where an experiment is executed in a laboratory (an experimental laboratory), etc. That is, the chemical error model 18 executes prediction that is common to plants.

Figure 18:
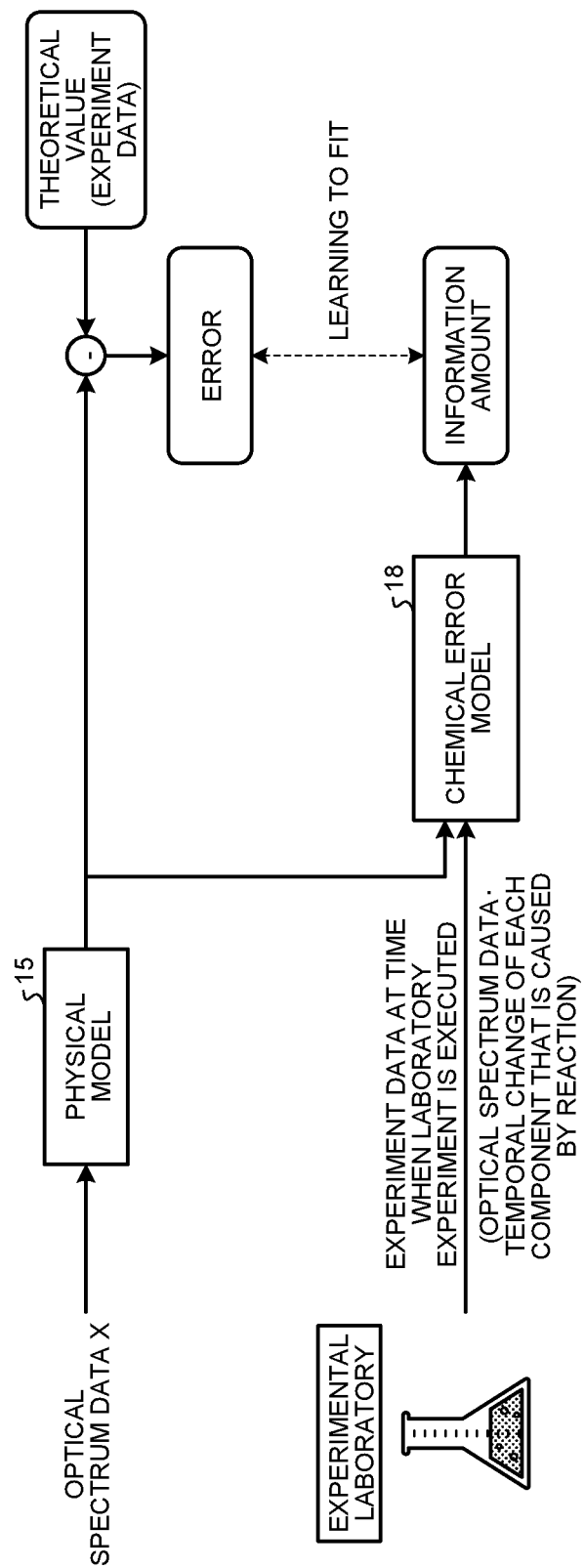
FIG. 18 is a diagram that explains a chemical error model according to one or more embodiments.

FIG. 18 is a diagram that explains the chemical error model 18 according to one or more embodiments. As illustrated in FIG. 18, the chemical error model 18 is a prediction model that outputs an information amount depending on inputs of experiment data that are obtained in an experimental laboratory, etc., and an output result that is calculated by a physical model 15 by using optical spectrum data X that are obtained in such an experimental laboratory, etc., and is trained in such a manner that such an information amount fits an error between such an output result of the physical model 15 and a theoretical value.

That is, the chemical error model 18 is generated by machine learning that uses training data that include experiment data that are obtained in an experimental laboratory, etc., and an output result of the physical model 15 as explanatory variables and include an error as described above as an objective variable.

Additionally, experiment data include optical spectrum data at a time when an experiment is executed, a temporal change of each component at a time of chemical reaction and/or spectroscopy, etc. For optical spectrum data, it is possible to use difference spectrum data, similarly to embodiments as described above. Furthermore, for a theoretical value, it is also possible to adopt it from a past history, it is also possible to calculate it from a theoretical physical formula, etc., and it is also possible to adopt a value that is obtained empirically.

The mechanical error model 19 is a prediction model that is generated by using plant data that are acquired at each plant, etc. That is, the mechanical error model 19 executes prediction that is focused on each plant.

Figure 19:
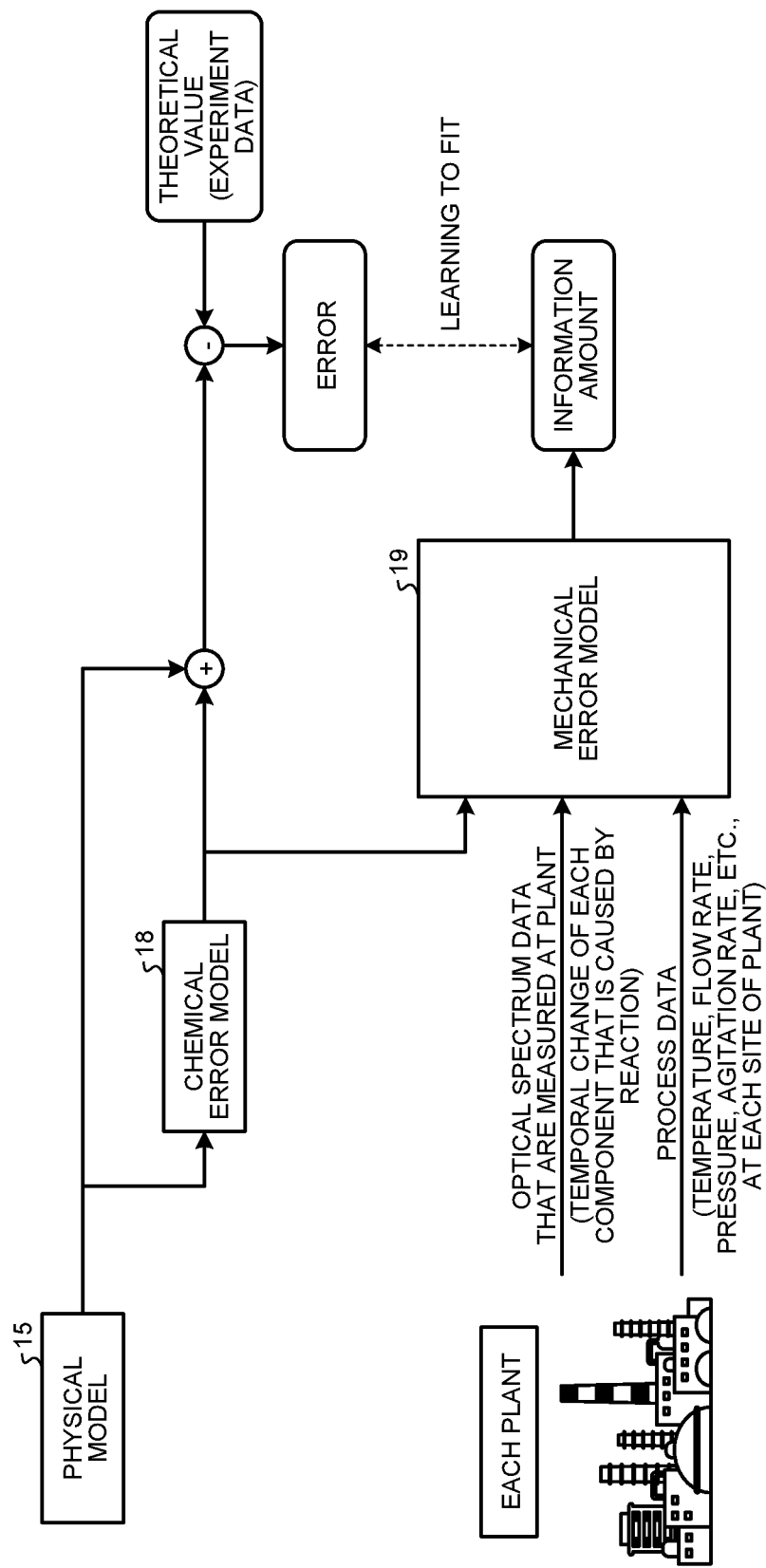
FIG. 19 is a diagram that explains a mechanical error model according to one or more embodiments.

FIG. 19 is a diagram that explains the mechanical error model 19 according to one or more embodiments. As illustrated in FIG. 19, the mechanical error model 19 is a prediction model that outputs an information amount depending on inputs of optical spectrum data X that are measured at a plant as an application target, process data that are measured at such a plant, and the chemical error model 18, and is trained in such a manner that such an information amount fits an error between an added value that is provided by adding an output result of the physical model 15 and an output result of the chemical error model 19 and a theoretical value.

That is, the mechanical error model 19 is generated by machine learning that uses training data that include data that are measured at each plant and an output result of the chemical error model 18 as explanatory variables and include an error as described above as an objective variable.

Additionally, process data include a temperature, a flow rate, a pressure, an agitation rate, etc., at each site of a plant. Furthermore, it is also possible for optical spectrum data for each plant to include a temporal change of each component at a time of spectroscopy, etc., and it is possible to use difference spectrum data as described above. Furthermore, for a theoretical value, it is also possible to adopt it from a past history, it is also possible to calculate it by a theoretical physical formula, etc., and it is also possible to adopt a value that is obtained empirically.

The second prediction unit 26 is a processing unit that acquires information that complements an output result of the physical model 15 by using the chemical error model 18 that is common to respective plants when operation assistance of a plant where a hybrid model is applied is executed.

The third prediction unit 27 is a processing unit that acquires information that complements an output result of the chemical error model 18 by using the mechanical error model 19 that is focused on each plant when operation assistance of a plant where a hybrid model is applied is executed.

Figure 20:
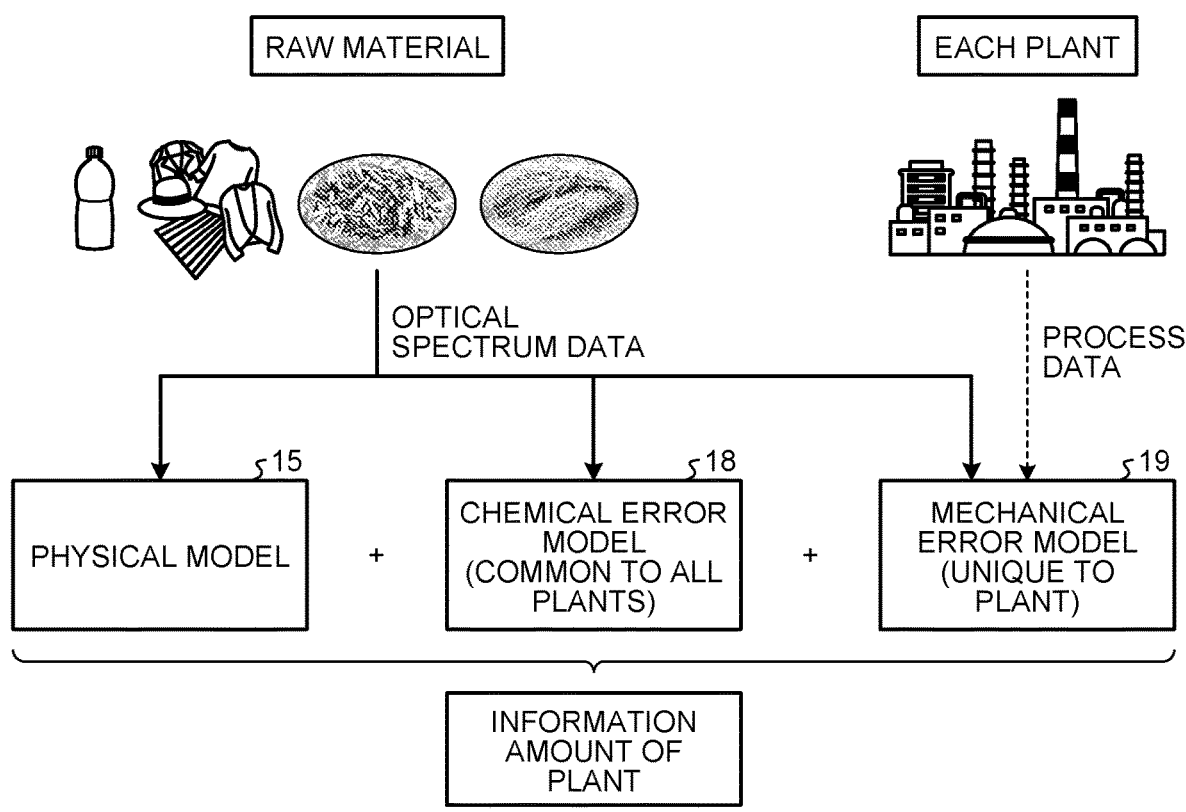
FIG. 20 is a diagram that explains operation assistance according to one or more embodiments.

Herein, a chemical plant 1 as illustrated in FIG. 1 will specifically be explained as an example. FIG. 20 is a diagram that explains operation assistance according to one or more embodiments. As illustrated in FIG. 20, the information processing device 10 has the physical model 15 that is generated theoretically, the chemical error model 18 that executes prediction that is common to respective plants by using experiment data, and the mechanical error model 19 that is focused on the chemical plant 1 as an application target.

In such a state, the information processing device 10 inputs a concentration that is obtained from optical spectrum data of a raw material to the physical model 15 so as to acquire a first output result. Furthermore, the information processing device 10 inputs optical spectrum data (difference spectrum data) of a raw material and a first output result of the physical model 15 to the chemical error model 18 so as to acquire a second output result. Furthermore, the information processing device 10 inputs optical spectrum data (difference spectrum data) and plant data that are measured at the chemical plant 1 and a second output result of the chemical error model 18 to the mechanical error model 19 so as to acquire a third output result.

Then, the information processing device 10 calculates a total value that is provided by adding a first output result, a second output result, and a third output result, as an information amount of the chemical plant 1. Subsequently, the information processing device 10 executes operation assistance of the chemical plant 1, based on such an information amount.

Figure 21:
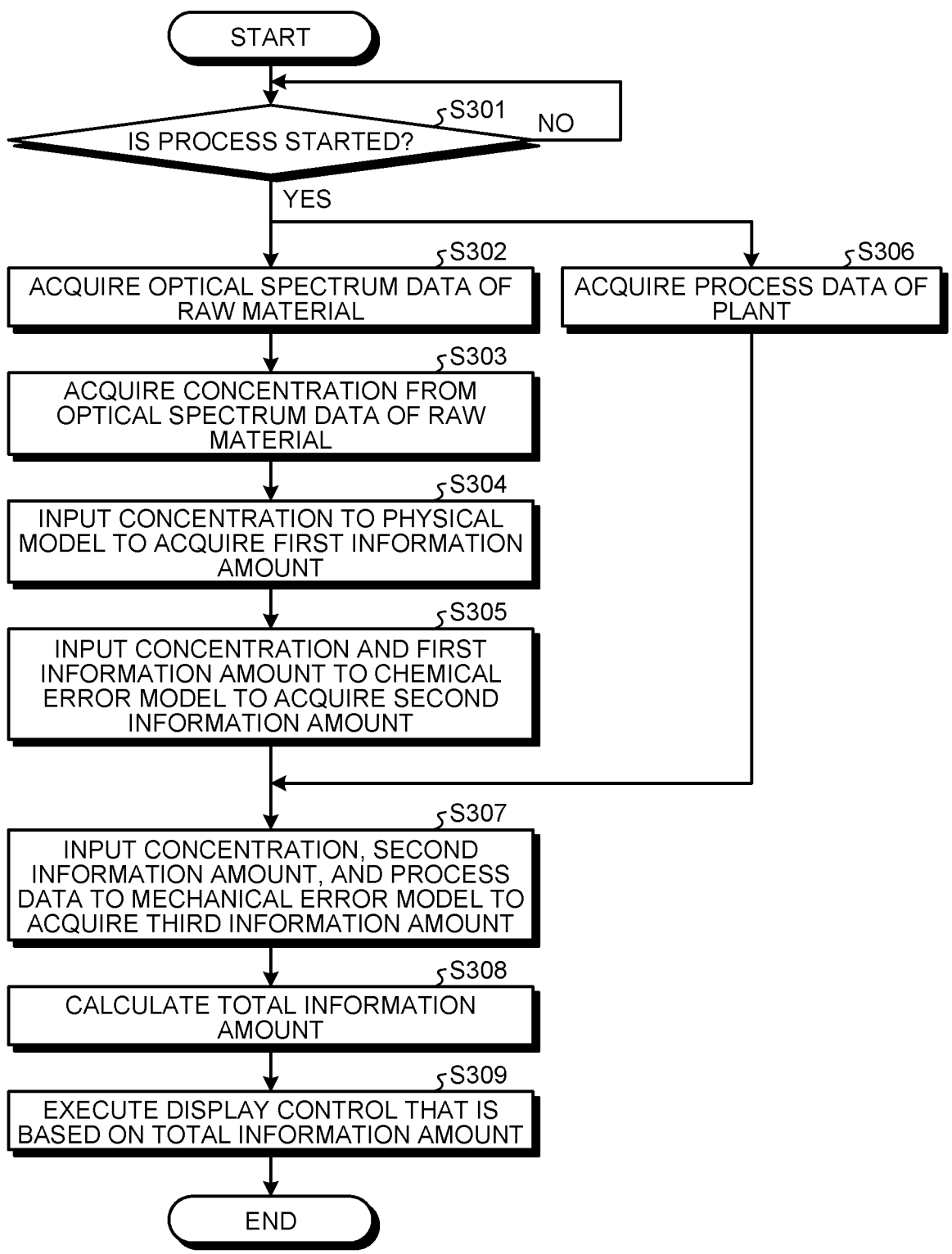
FIG. 21 is a flowchart that illustrates a flow of a process according to one or more embodiments.

FIG. 21 is a flowchart that illustrates a flow of a process according to one or more embodiments. As illustrated in FIG. 21, as a process is started (S301: Yes), a first prediction unit 22 acquires optical spectrum data of a raw material (S302) and acquires a concentration from such optical spectrum data of a raw material (S303). Subsequently, the first prediction unit 22 inputs a concentration to the physical model 15 so as to acquire a first information amount (S304).

Furthermore, the second prediction unit 26 inputs a concentration and a first information amount to the chemical error model 18 so as to acquire a second information amount (S305).

Furthermore, the third prediction unit 27 acquires process data from a plant (S306), and inputs a concentration, a second information amount, and such process data to the mechanical error model 19 so as to acquire a third information amount (S307).

Subsequently, the optimum operation amount computation unit 24 calculates a total information amount that is provided by adding a first information amount, a second information amount, and a third information amount (S308), and executes display control that is based on such a total information amount (S309).

Effect

As described above, it is possible for the information processing device 10 to complement an output result of the physical model 15 by using both the chemical error model 18 that is trained by data that are common to plants and the mechanical error model 19 that is trained so as to be focused on a plant as an application target. Therefore, it is possible for the information processing device 10 to execute operation assistance where both information that is common to all plants and information that is unique to each plant are taken into consideration, so that it is possible to execute, for example, operation assistance that avoids both a common accident and a unique accident.

FIFTH EXAMPLE

It is possible for the information processing device 10 as described above to visualize, and thereby present to an operator, etc., an output result of each model and/or information concerning operation assistance. Hence, an information processing device 10 that executes visualization of information will be explained in one or more embodiments.

Overall Configuration

Figure 22:
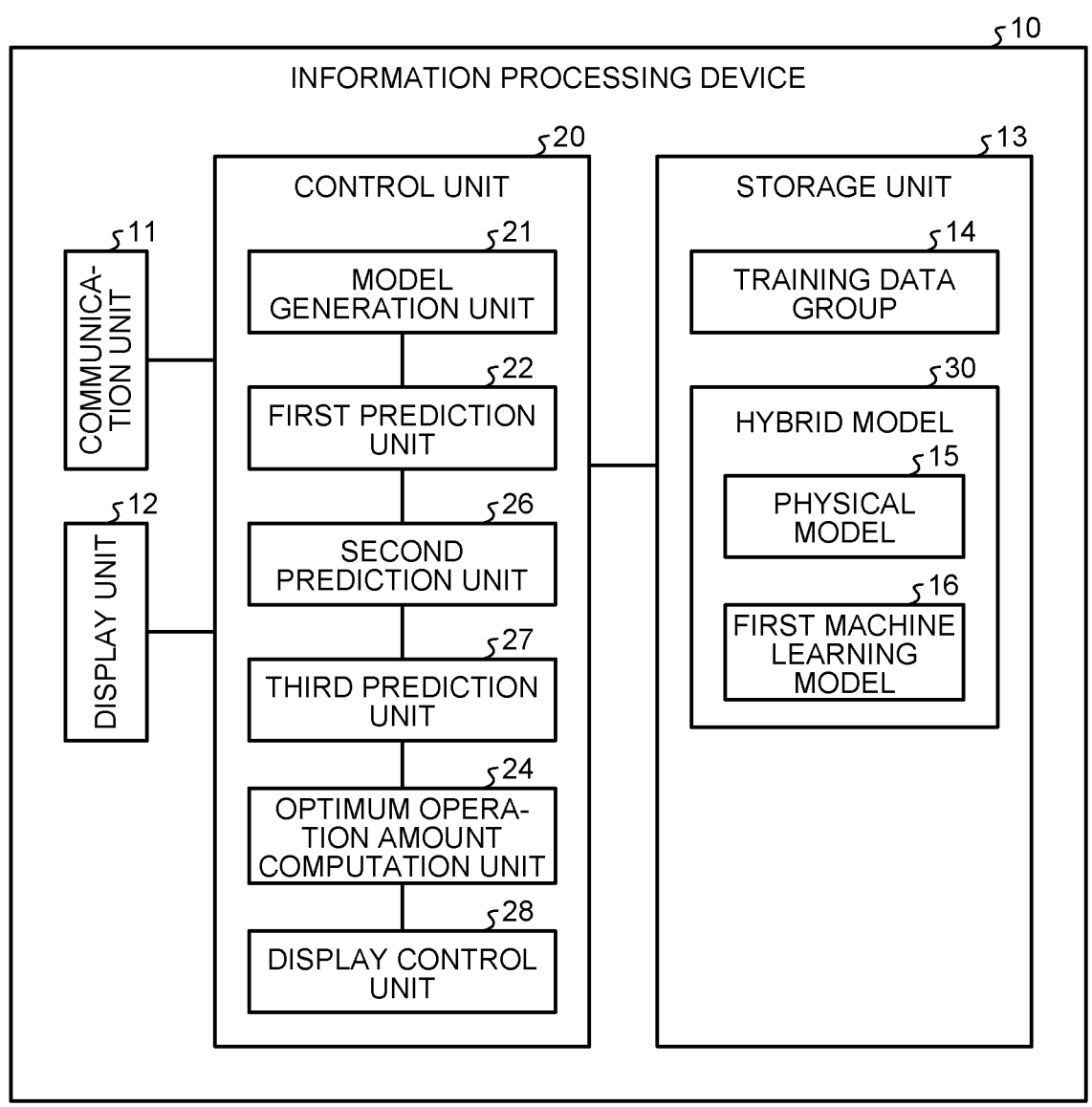
FIG. 22 is a functional block diagram that illustrates a functional configuration of an information processing device according to one or more embodiments.

FIG. 22 is a functional block diagram that illustrates a functional configuration of the information processing device 10 according to one or more embodiments. Although an example of application of a configuration of the first example will be explained herein, it is also possible to apply it to other embodiments similarly.

As illustrated in FIG. 22, the information processing device 10 according to one or more embodiments has a communication unit 11, a display unit 12, a storage unit 13, and a control unit 20. Herein, the control unit 20 has a display control unit 28, differently from embodiments as described above. Additionally, a physical model 15 and a first machine learning model 16 (an error model) will collectively be described as a hybrid model 30.

The display control unit 28 is a processing unit that visualizes a prediction result of the hybrid model 30. For example, the display control unit 28 visualizes each of rates of a prediction result of the physical model 15 and a prediction result of the first machine learning model 16 that are included in prediction results of the hybrid model 30. Furthermore, it is also possible for the display control unit 28 to visualize a difference between a measurement value that is actually measured or a theoretical value and a prediction result of the hybrid model 30.

Figure 23:
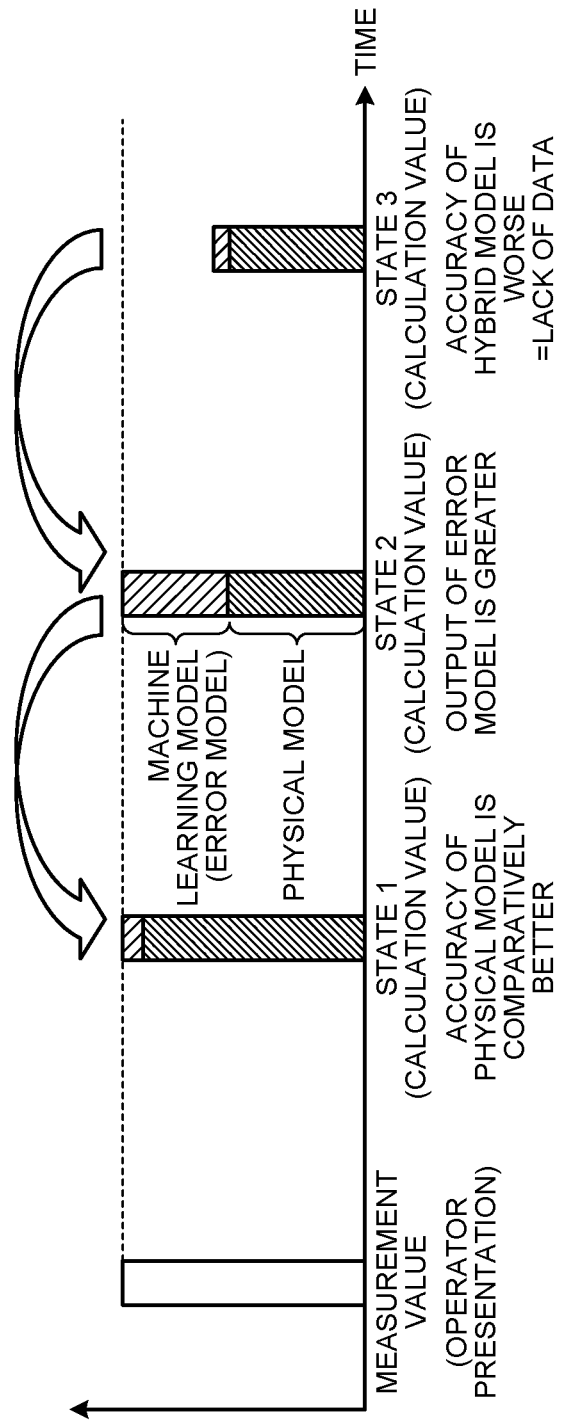
FIG. 23 is a diagram that explains an example of visualization of a hybrid model according to one or more embodiments.

FIG. 23 is a diagram that explains an example of visualization of the hybrid model 30 according to one or more embodiments. FIG. 23 illustrates an example where prediction (calculation) is executed in an order of a time series of state 1 (a calculation value), state 2 (a calculation value), and state 3 (a calculation value). As illustrated in FIG. 23, the display control unit 28 visualizes that an error from a measurement value in state 1 falls within a threshold or less so that it is also possible to execute prediction accurately. Furthermore, a rate of an output result of an error model is lower, so that the display control unit 28 visualizes that accuracy of the physical model 15 is comparatively better.

Furthermore, the display control unit 28 visualizes that an error from a measurement value in state 2 falls within a threshold or less so that it is also possible to execute prediction accurately. Furthermore, a rate of an output result of an error model is increased as compared with state 1, so that the display control unit 28 visualizes that accuracy of the physical model 15 is degraded.

Moreover, the display control unit 28 visualizes that an error from a measurement value in state 3 is a threshold or greater so that accuracy of prediction is significantly degraded, and visualizes that accuracy of the hybrid model 30 is worse. As a result, a lack of training data is caused in state 3, so that it is possible for the display control unit 28 to notify an operator that reconstruction of the hybrid model 30 is needed.

Figure 24:
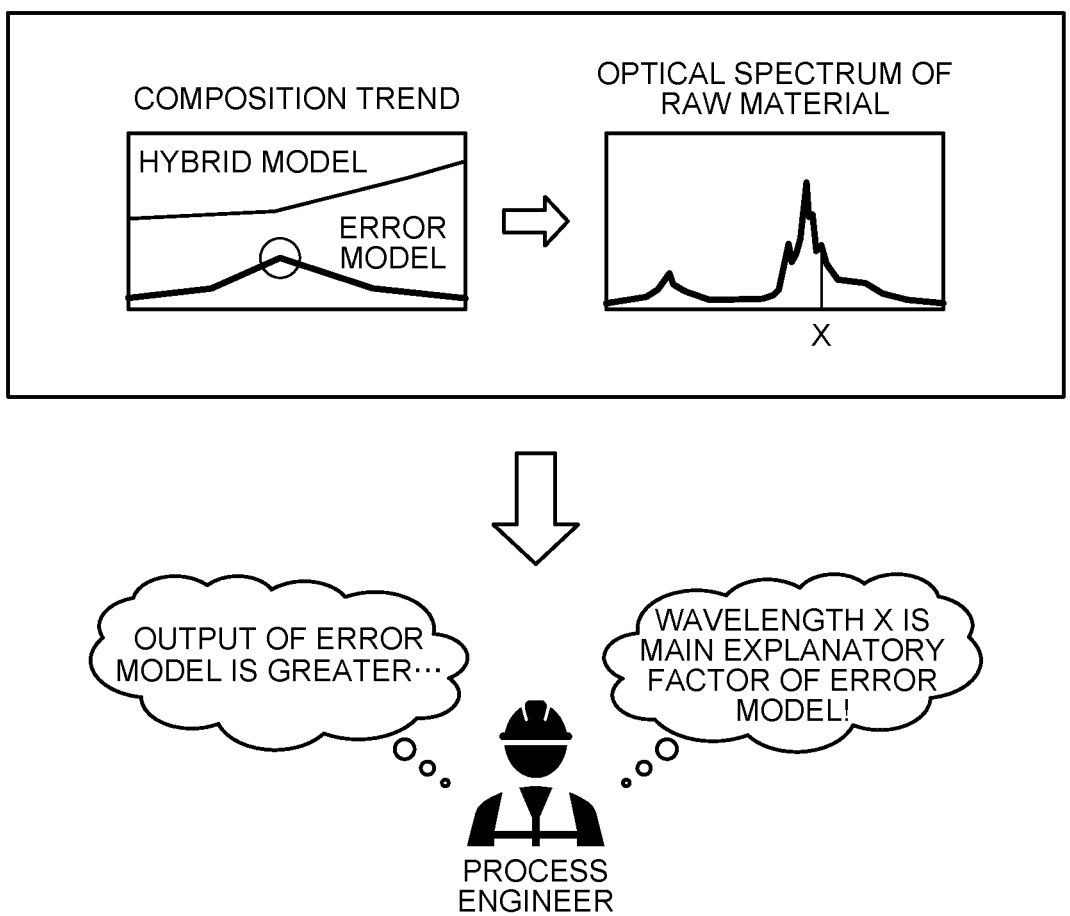
FIG. 24 is a diagram that illustrates example 1 of feedback of a hybrid model according to one or more embodiments.

Furthermore, it is also possible for the information processing device 10 to feed back a prediction result of the hybrid model 30. FIG. 24 is a diagram that illustrates example 1 of feedback of the hybrid model 30 according to one or more embodiments. As illustrated in FIG. 24, the display control unit 28 displays a time-series change of the hybrid model 30 and a time-series change of the first machine learning model 16 (an error model) on an identical time axis, as a composition trend that indicates a state of a composition in depolymerization at the chemical plant 1. Moreover, the display control unit 28 also displays a state of optical spectrum data of a raw material that is used in prediction of the hybrid model 30, on an identical time axis, correspondingly.

Thus, it is possible for the information processing device 10 to execute refining of the physical model 15 and it is possible to execute refining of an error model.

As a result, it is possible for a plant operator and/or a process engineer to view a time zone where an output of an error model is increased. That is, it is possible for a plant operator and/or a process engineer to specify a time point where accuracy of prediction of the physical model 15 is degraded. Moreover, it is also possible for a plant operator and/or a process engineer to view a state of optical spectrum data of a raw material at such a time point, so that it is also possible to specify that, for example, a wavelength X is a main explanatory factor of an error model. Therefore, it is possible for a plant operator and/or a process engineer to execute consideration of addition of a sensor and consideration of training data for a machine learning model, so that it is possible to execute utilization of a suitable machine learning model.

Figure 25:
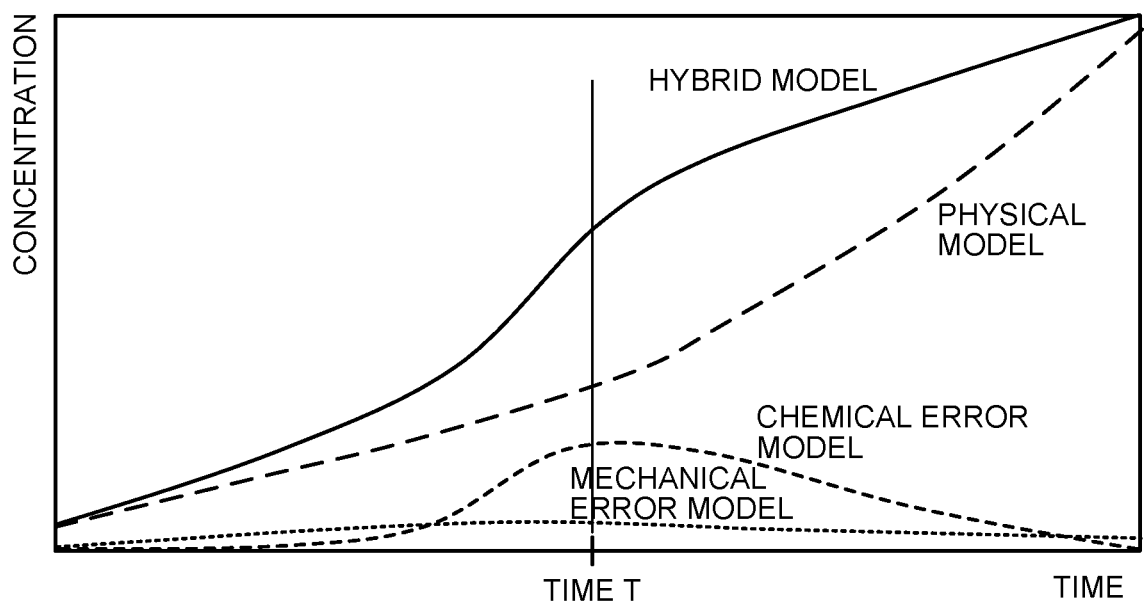
FIG. 25 is a diagram that illustrates example 2 of feedback of a hybrid model according to one or more embodiments.

Furthermore, it is also possible for the information processing device 10 to generate and output a display screen for a result of the hybrid model 30. FIG. 25 is a diagram that illustrates example 2 of feedback of the hybrid model 30 according to one or more embodiments. FIG. 25 illustrates a time-series change of a result of a monomer concentration that is predicted by the hybrid model 30 by using the fourth example that has a chemical error model 18 and a mechanical error model 19.

As illustrated in FIG. 25, the display control unit 28 also displays, in addition to a change of an absolute value (a concentration) of an output that is finally predicted by the hybrid model 30, each of outputs (concentrations) of the physical model 15, the chemical error model 18, and the mechanical error model 19 that are elements that compose such an output.

Figure 26:
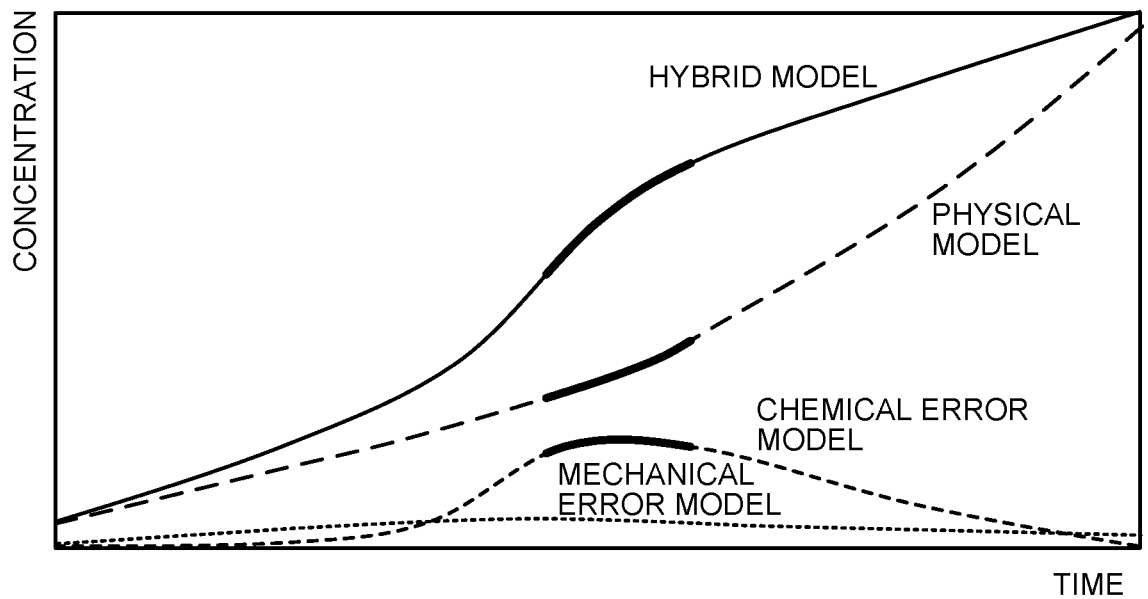
FIG. 26 is a diagram that illustrates an example of emphatic display according to one or more embodiments.
Figure 27:
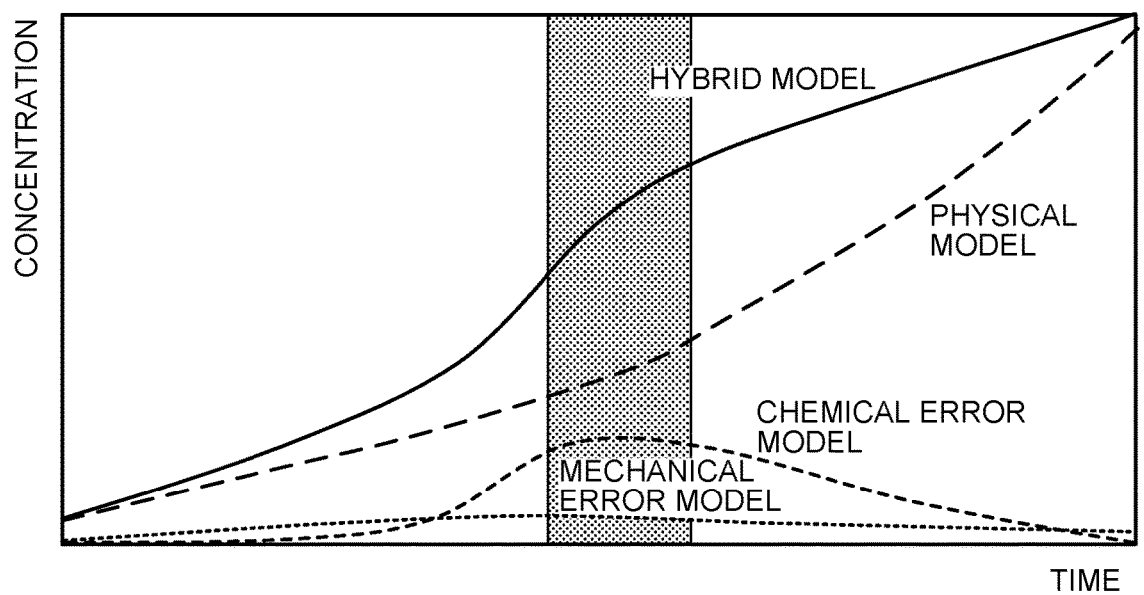
FIG. 27 is a diagram that illustrates an example of emphatic display according to one or more embodiments.

Herein, it is possible for the display control unit 28 to display a place where the physical model 15 is corrected emphatically. FIG. 26 and FIG. 27 are diagrams that illustrate examples of emphatic display. As illustrated in FIG. 26, it is possible for the display control unit 28 to display a corresponding place of each model within a time zone where the physical model 15 is corrected, by a thick line, emphatically. Additionally, for an example of emphatic display, it is possible to adopt a thickness, a color, blinking display, etc., of a line.

Moreover, as illustrated in FIG. 27, it is possible for the display control unit 28 to present (emphatically display), as timing of reconstruction, for example, a time zone that includes a time T in FIG. 25 where outputs of error models (the chemical error model 18 and the mechanical error model 19) are a threshold or greater and an output of the physical model 15 is corrected by a predetermined value or greater. That is, the display control unit 28 visualizes, by emphatic display, that correction that is executed by an error model exceeds a certain level. As a result, it is also possible for a plant operator and/or a process engineer to obtain a hint for improving the physical model 15 by analyzing optical spectrum data and/or a state of the chemical plant 1 within such a time zone.

It is possible for the information processing device 10 as described above to provide a consulting tool and/or knowledge of control, so that it is possible to realize bridging between a chemical plant operation company (a licensee) that establishes a plant early and wishes to use a raw material of a recycled material and/or wishes to realize a stable process operation at a lower cost and a pilot plant operation company (a licenser) that wishes to improve a value of a license, wishes to execute a consulting business, and/or wishes to execute an investment.

For example, the information processing device 10 acquires experiment data and/or process data from a licenser and obtains a reward from a licensee, so that it is possible to provide a process that is explained in each embodiment as described above, as a service, by utilizing knowledge of such a licenser. As a result, it is possible for a management company of the information processing device 10 to grow a business and it is also possible to attain activation of a plant industry.

ANOTHER/OTHER EXAMPLE(S)

Additionally, although embodiments of the present invention have been explained hereinbefore, the present invention may also be implemented in a variety of different modes, other than such embodiments as described above.

Numerical Value(s), etc.

A data example, a calculation formula of a physical model, a prediction target, etc., that is/are used in embodiments as described above is/are merely an example(s) and it is possible to execute any change thereof. Furthermore, although an example where a concentration as an example of a first component and difference spectrum data as an example of a second component are used has been explained, this is not limiting. For example, it is also possible to provide another/other element(s) such as a temperature that is included in composition data as a target for information that is based on a raw material and it is also possible to acquire and use a temperature as a first component by using optical spectrum data.

Furthermore, although a chemical plant has been explained as an example in embodiments as described above, this is not limiting and it is possible to apply it to various types of plants that use petroleum, petroleum chemistry, chemistry, a gas, etc. Furthermore, although an example that uses optical spectrum data has been explained in embodiments as described above, this is not limiting and it is possible to execute an appropriate change, depending on data that are used for an input to a physical model. For example, in a case where a physical model is a simulator and a flow rate in a pipe is used for such a simulator, it is possible to use data concerning a pipe such as a flow rate, a size of a pipe, plant data that are obtained from such a flow rate, etc., for each machine learning model, and in a case where a temperature is used for such a simulator, it is possible to use data concerning a temperature such as a temperature, a humidity, and/or plant data that are obtained from such a temperature, etc., for each machine learning model.

System

It is possible to apply any change to information that includes a process procedure, a control procedure, a specific name, and various types of data and/or parameters as provided in a document and/or a drawing(s) as described above, unless otherwise specified.

Furthermore, each component of each device as illustrated in the drawing(s) is functionally conceptual and does not have to be physically configured as illustrated in the drawing(s). That is, a specific mode of distribution and/or integration of respective devices is not limited to that/those illustrated in the drawing(s). That is, it is possible to distribute and/or integrate all or a part(s) thereof functionally or physically in any unit depending on various types of loads, usage, etc., so as to provide a configuration thereof.

Moreover, for each process function that is executed in each device, it is possible to realize all or any part thereof by a Central Processing Unit (CPU) and a program (instructions) that is analyzed and executed in such a CPU or it is possible to realize it/them as hardware according to wired logic.

Hardware

Figure 28:
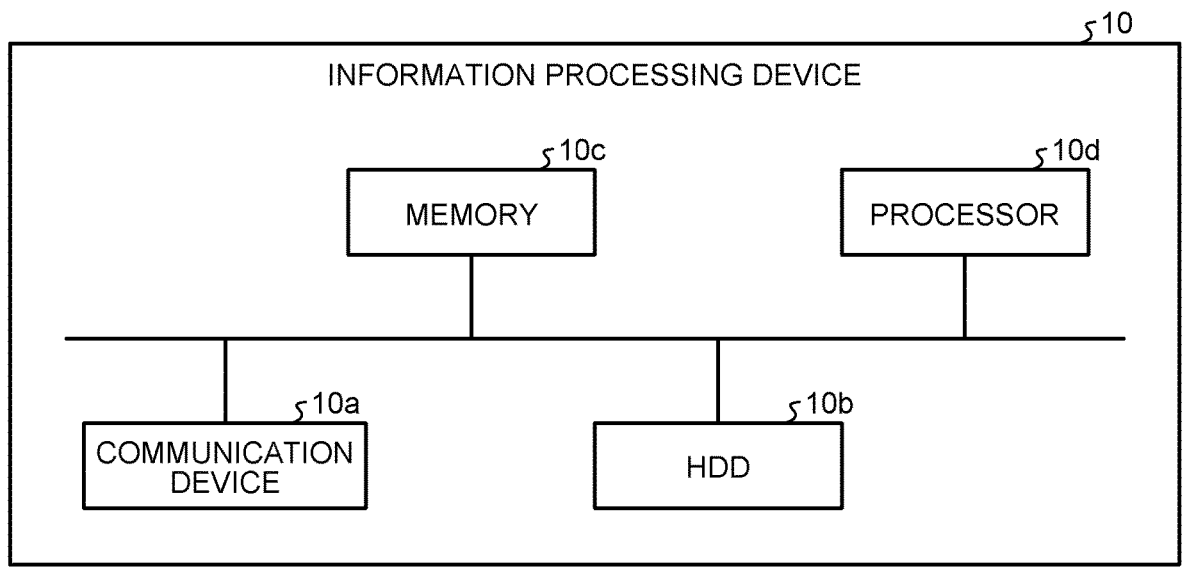
FIG. 28 is a diagram that explains an example of a hardware configuration according to one or more embodiments.

Next, an example of a hardware configuration of the information processing device 10 will be explained. FIG. 28 is a diagram that explains an example of a hardware configuration thereof. As illustrated in FIG. 28, the information processing device 10 has a communication device 10$a$, a Hard Disk Drive (HDD) 10$b$, a memory 10$c$, and a processor 10$d$. Furthermore, respective units as illustrated in FIG. 28 are mutually connected by a bus, etc.

The communication device 10$a$ is a network interface card, etc., and executes communication with another/other server(s). The HDD 10$b$ stores a program (instructions) and/or a DB that run(s) a function as illustrated in FIG. 4.

The processor 10$d$ reads from the HDD 10$b$, etc., and deploys on the memory 10$c$, a program (instructions) that executes a process that is similar to that of each processing unit as illustrated in FIG. 4, so as to run a process that executes each function as explained in FIG. 4, etc. For example, as the first example is provided as an example, such a process executes a function that is similar to that of each processing unit that is possessed by the information processing device 10. Specifically, the processor 10$d$ reads, from the HDD 10$b$, etc., a program (instructions) that has a function that is similar to those of the model generation unit 21, the first prediction unit 22, the second prediction unit 23, the optimum operation amount computation unit 24, etc. Then, the processor 10$d$ executes a process that executes a process that is similar to those of the model generation unit 21, the first prediction unit 22, the second prediction unit 23, the optimum operation amount computation unit 24, etc.

Thus, the information processing device 10 reads and executes a program (instructions) so as to operate as an information processing device that executes an information processing method. Furthermore, the information processing device 10 reads a program (instructions) as described above from a recording medium by a medium reading device and execute a read program (read instructions) as described above, so that it is also possible to realize a function that is similar to that/those of embodiments as described above. Additionally, a program (instructions) that is referred to in other such embodiments is not limited to one that is executed by the information processing device 10. For example, also in a case where another computer or server executes a program (instructions) and/or a case where these execute such a program (instructions) cooperatively, it is possible to apply the present invention thereto similarly.

It is possible to distribute such a program (instructions) through a network such as the Internet. Furthermore, such a program (instructions) is recorded in a computer-readable recording medium such as a hard disk, a flexible disk (FD), a CD-ROM, a Magneto-Optical disk (MO), or a Digital Versatile Disc (DVD), and is read from such a recording medium by a computer, so as to be able to be executed.

According to the embodiments, it is possible to construct an operation assistance system of a plant.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

What is claimed is:

1. An information processing device comprising:
   a controller that:
      acquires a first prediction result that indicates information concerning a state of a plant that is predicted by a physical model, and
      acquires a second prediction result that indicates information concerning a state of the plant that is predicted by a machine learning model that is generated based on data concerning the plant; and
   a display that:
      displays the first prediction result and the second prediction result,
   wherein, the controller acquires a third prediction result based on a first machine learning model that is generated based on data that are common to a plurality of plants and acquires a fourth prediction result based on a second machine learning model that is generated based on plant data that are generated at a target plant that is a prediction target, as the second prediction result, and
   the display further displays a correction result that is provided by correcting the first prediction result based on the third prediction result and the fourth prediction result.

2. The information processing device according to claim 1, wherein the display displays a time change of each of the first prediction result, the third prediction result, and the fourth prediction result, and a time change of the correction result on a common time axis.

3. The information processing device according to claim 1, wherein the display emphatically displays a place where the first prediction result is corrected by the third prediction result and the fourth prediction result.

4. The information processing device according to claim 1, wherein the display displays a time point where the first prediction result is corrected by a predetermined value or greater, as timing of reconstruction of the physical model.

5. A display control method comprising:
   acquiring a first prediction result that indicates information concerning a state of a plant that is predicted by a physical model;
   acquiring a second prediction result that indicates information concerning a state of the plant that is predicted by a machine learning model that is generated based on data concerning the plant;
   displaying the first prediction result and the second prediction result;
   acquiring a third prediction result based on a first machine learning model that is generated based on data that are common to a plurality of plants and acquiring a fourth prediction result based on a second machine learning model that is generated based on plant data that are generated at a target plant that is a prediction target, as the second prediction result; and
   displaying a correction result that is provided by correcting the first prediction result based on the third prediction result and the fourth prediction result.

6. A non-transitory computer-readable recording medium having stored therein display control instructions that cause a computer to perform a process comprising:
   acquiring a first prediction result that indicates information concerning a state of a plant that is predicted by a physical model;
   acquiring a second prediction result that indicates information concerning a state of the plant that is predicted by a machine learning model that is generated based on data concerning the plant;
   displaying the first prediction result and the second prediction result;
   acquiring a third prediction result based on a first machine learning model that is generated based on data that are common to a plurality of plants and acquiring a fourth prediction result based on a second machine learning model that is generated based on plant data that are generated at a target plant that is a prediction target, as the second prediction result; and
   displaying a correction result that is provided by correcting the first prediction result based on the third prediction result and the fourth prediction result.

* * * * *